US012597307B2

(12) United States Patent
Motos et al.

(10) Patent No.: US 12,597,307 B2
(45) Date of Patent: Apr. 7, 2026

(54) EARLY COMMIT LATE DETECT ATTACK PREVENTION

(71) Applicant: TEXAS INSTRUMENTS INCORPORATED, Dallas, TX (US)

(72) Inventors: Tomas Motos, Hamar (NO); Hunor Melegh, Heggedal (NO); Eivind Syvertsen, Oslo (NO)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 18/544,089

(22) Filed: Dec. 18, 2023

(65) Prior Publication Data

US 2024/0378930 A1 Nov. 14, 2024

Related U.S. Application Data

(60) Provisional application No. 63/520,510, filed on Aug. 18, 2023, provisional application No. 63/500,748, filed on May 8, 2023.

(51) Int. Cl.
*G07C 9/00* (2020.01)

(52) U.S. Cl.
CPC .................... *G07C 9/00309* (2013.01); *G07C 2009/00555* (2013.01)

(58) Field of Classification Search
CPC ..... G07C 9/00309; G07C 2009/00555; H04W 12/122; H04W 12/63
See application file for complete search history.

(56) References Cited

U.S. PATENT DOCUMENTS

| | | | | |
|---|---|---|---|---|
| 9,102,296 | B2 | 8/2015 | Seiberts | |
| 10,427,643 | B1 * | 10/2019 | Casamassima | H04B 17/318 |
| 2013/0078906 | A1 * | 3/2013 | Ben Hamida | H04L 63/1466 455/7 |
| 2016/0234684 | A1 * | 8/2016 | Hekstra | G06F 21/30 |
| 2020/0114875 | A1 | 4/2020 | Stitt | |
| 2021/0099884 | A1 | 4/2021 | Marquez | |
| 2021/0204136 | A1 | 7/2021 | Lummer | |

(Continued)

FOREIGN PATENT DOCUMENTS

WO 2018186950 A1 10/2018

OTHER PUBLICATIONS

Arslan Hüseyin et al: "Physical Layer Security for Wireless Sensing and Communication", IET Security Series, Dec. 31, 2022 (Dec. 31, 2022), pp. 1-359, XP093179568, Retrieved from the Internet: URL:https://digital-library.theiet.org/content/books/sc/pbse018e;jsessionid=30pawjjuj5igh.x-iet-live-01, [retrieved on Jul. 30, 2024].

(Continued)

*Primary Examiner* — Nabil H Syed
(74) *Attorney, Agent, or Firm* — Michelle F. Murray; Frank D. Cimino

(57) ABSTRACT

In an embodiment, a method includes identifying, by a first device, a level of degradation. The method also includes transmitting, by the first device during a communication phase, a first signal with a first signal quality based on the level of degradation. The method further includes transmitting, by the first device during a second communication phase, a second signal with a second signal quality. The second signal quality may be greater than the first signal quality.

21 Claims, 25 Drawing Sheets

(56) References Cited

U.S. PATENT DOCUMENTS

| | | | | |
|---|---|---|---|---|
| 2022/0379845 | A1* | 12/2022 | Stitt | B60R 25/209 |
| 2023/0068613 | A1 | 3/2023 | Motos | |

OTHER PUBLICATIONS

Omar Choudary et al: “Make Noise and Whisper: A Solution to Relay Attacks”, Mar. 28, 2011 (Mar. 28, 2011), SAT 2015 18th International Conference, Austin, TX, USA, Sep. 24-27, 2015; [Lecture Notes in Computer Science; Lect.Notes Computer], Springer, Berlin, Heidelberg, pp. 271-283, XP019171638.

* cited by examiner

| | | | |
|---|---|---|---|
| FILTER DELAY (FD) | 31 ns | 62 ns | 125 ns |
| DETECTION DELAY (DD) 40 dB SNR, BER = 1 PERCENT | -80 ns | -100 ns | -160 ns |
| TOTAL ATTACK DELAY (TAD) | -49 ns | -38 ns | -35 ns |

700

BER

802

801

900

1100

1300

1700
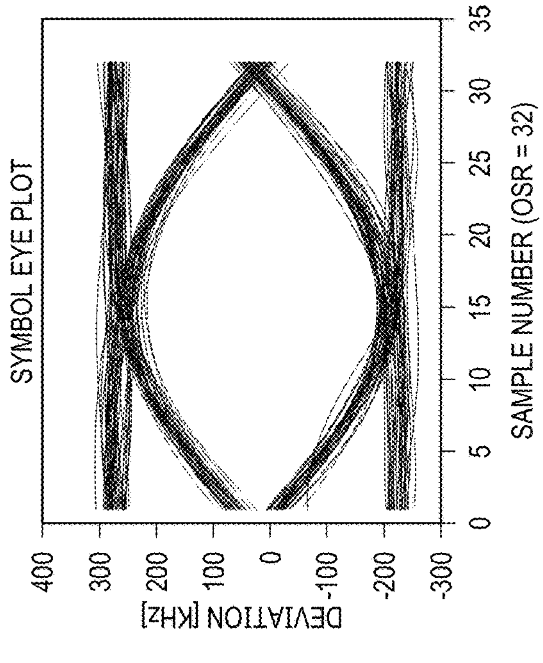
FIG. 17
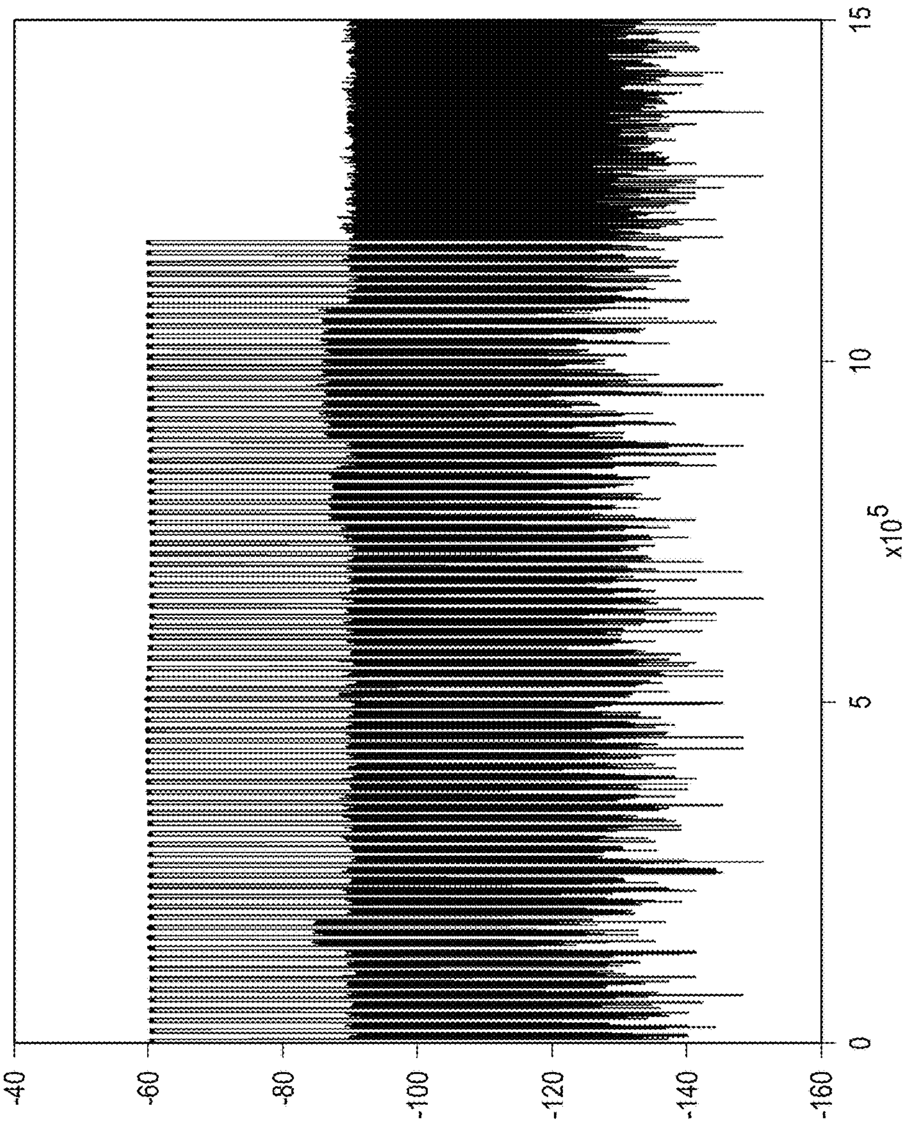

1800

1900

2000

EARLY COMMIT LATE DETECT ATTACK PREVENTION

CROSS-REFERENCE TO RELATED APPLICATIONS

This application claims the priority benefit of U.S. Provisional Patent Application No. 63/500,748, filed May 8, 2023, entitled "EARLY COMMIT LATE DETECT ATTACK PREVENTION," and U.S. Provisional Patent Application No. 63/520,510, filed Aug. 18, 2023, entitled "EARLY COMMIT LATE DETECT ATTACK PREVENTION," which applications are hereby incorporated herein by reference.

TECHNICAL FIELD

The present disclosure relates generally to an electronic system and method, and, in particular embodiments, to a method for early commit late detect (ECLD) attack prevention.

BACKGROUND

Early commit late detect (ECLD) attacks can occur in wireless communication environments when an attacking device learns symbols of a transmitted signal early during a communication phase between two devices and commits the symbols later in the communication phase to attempt to deceive the receiving device about the arrival time of the transmitted signal, and consequently, the proximity of the transmitting device to the receiving device. In turn, if successful, the receiving device may perform an action based on the signal, such as unlocking a device (e.g., a vehicle door, a hotel door) for the attacker.

Existing solutions to thwarting ECLD attacks may include randomizing symbols transmitted from one device to another device, shortening pulses of the signals transmitted from one device to another device, and bounding proximity and distance to shorter values, for example. However, some of these solutions require additional circuitry components, which may increase the cost and design area of a system for access control, and/or may affect the performance of the device.

SUMMARY

Some embodiments disclosed herein advantageously result in improvements to early commit late detect attack prevention. Some embodiments may prevent attacks on devices and systems by manipulating signals communicated between devices such that attacks on the devices are detectable. In an example embodiment, a method for preventing ECLD attacks is provided. The method includes identifying, by a first device, a level of degradation, transmitting, by the first device during a first communication phase, a first signal with a first signal quality based on the level of degradation, and transmitting, by the first device during a second communication phase, a second signal with a second signal quality, wherein the second signal quality is greater than the first signal quality.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

For a more complete understanding of the present invention(s), and the advantages thereof, reference is now made to the following descriptions taken in conjunction with the accompanying drawings, in which:

FIGS. 10-20 show DD, EQI, eye diagrams, and waveforms for various scenarios, according to embodiments of the present disclosure.

Corresponding numerals and symbols in different figures generally refer to corresponding parts unless otherwise indicated. The figures are drawn to clearly illustrate the relevant aspects of the preferred embodiments and are not necessarily drawn to scale.

DETAILED DESCRIPTION

Figure 1A:
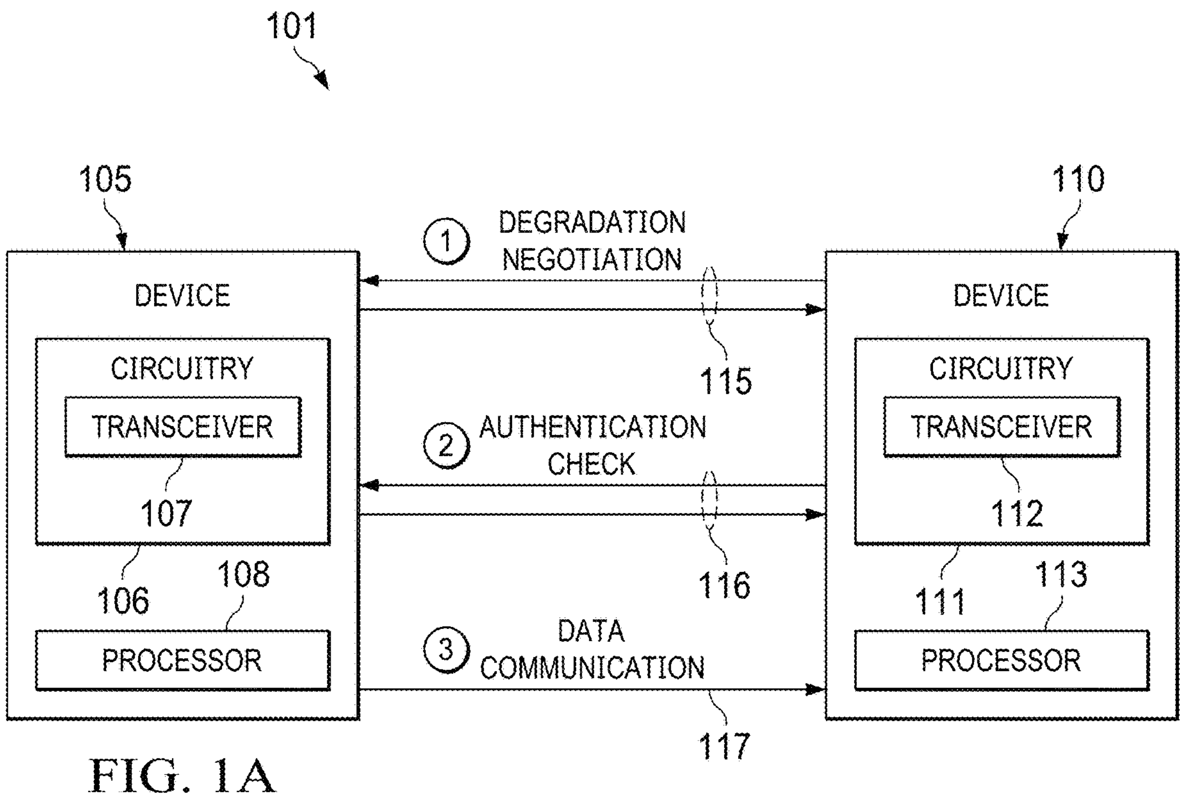
FIGS. 1A and 1B show block diagrams of a system, according to an embodiment of the present disclosure.

The making and using of the embodiments disclosed are discussed in detail below. It should be appreciated, however, that the present disclosure provides many applicable inventive concepts that can be embodied in a wide variety of specific contexts. The specific embodiments discussed are merely illustrative of specific ways to make and use the invention(s), and do not limit the scope of the invention(s).

The description below illustrates the various specific details to provide an in-depth understanding of several example embodiments according to the description. The embodiments may be obtained without one or more of the specific details, or with other methods, components, materials and the like. In other cases, known structures, materials or operations are not shown or described in detail so as not to obscure the different aspects of the embodiments. References to "an embodiment" in this description indicate that a particular configuration, structure or feature described in relation to the embodiment is included in at least one embodiment. Consequently, phrases such as "in one embodiment" that may appear at different points of the present description do not necessarily refer exactly to the same embodiment. Furthermore, specific formations, structures or features may be combined in any appropriate manner in one or more embodiments.

Embodiments of the present disclosure will be described in specific contexts, e.g., an early commit late detect (ECLD) attack prevention for unlocking a vehicle, e.g., using Bluetooth or Bluetooth Low Energy (BLE). Some embodiments may be used in other applications, such as for access control, e.g., in hotel rooms or businesses, as well as using other wireless communication protocols. Some embodiments may be used in applications different from access control, such as controlling a first device based on a proximity of a second device to the first device and/or for authenticating, by the first device, the second device based in part on the proximity of the second device to the first device.

ECLD attacks may be understood as a type of cyberattack on devices transmitting and receiving Bluetooth signals, for example. A malicious device attempting to commit an ECLD attack can mimic signals of one device to gain access or control of another device. For example, a malicious device can transmit copied signals from a smart phone to a vehicle to attempt to unlock the vehicle and gain access inside the vehicle. In this context, if the malicious device is successful, the vehicle may receive the copied signals and believe the signals were coming from the smart phone, or otherwise an authorized device, and perform an action based on the signals.

Disclosed herein are embodiments related to improved detection systems, devices, and methods for preventing ECLD attacks. In an embodiment, a first device (e.g., a key fob or another device acting as a key fob) uses an increased phase noise during transmission of an authentication packet, during an authentication phase (e.g., during or involving one or more channel sounding steps), to a second device (e.g., a vehicle), which may advantageously prevent, or mitigate, a MITM attack, or cause the attack to be detectable by the second device. In some embodiments, the increased phase noise is intentionally caused by increasing the bandwidth of a PLL of the first device during transmission of at least a portion of the authentication packet. In some embodiments, the first device uses a decreased phase noise while transmitting packets to the second device during a communication phase.

In some embodiments, a method of preventing ECLD attacks is provided. The method includes identifying, by a first device, a level of degradation, transmitting, by the first device during a first communication phase, a first signal with a first signal quality based on the level of degradation, and transmitting, by the first device during a second communication phase, a second signal with a second signal quality, wherein the second signal quality is greater than the first signal quality.

In another example embodiment, a device including a transmitter circuit and a processor is provided. The processor is configured to transmit, using the transmitter circuit during a first communication phase, a first packet with a first quality, and transmit, using the transmitter circuit during a second communication phase, a second packet with a second quality lower than the first quality.

In yet another example embodiment, a device including a transceiver and a processor is provided. The processor is configured to identify a level of degradation, identify a reference signal based on the level of degradation, receive a first signal, perform a comparison between the first signal and the reference signal to produce a comparison result, and determine whether the first signal is authentic or not authentic based on the comparison result.

Advantageously, systems, methods, and devices for preventing ECLD attacks may not only increase robustness of a secure device that provides access, but also reduce design area requirements and cost by utilizing existing transceiver circuitry to produce filterable distortion to detect attacks while abiding by Bluetooth communications standards and protocols.

Figure 1B:
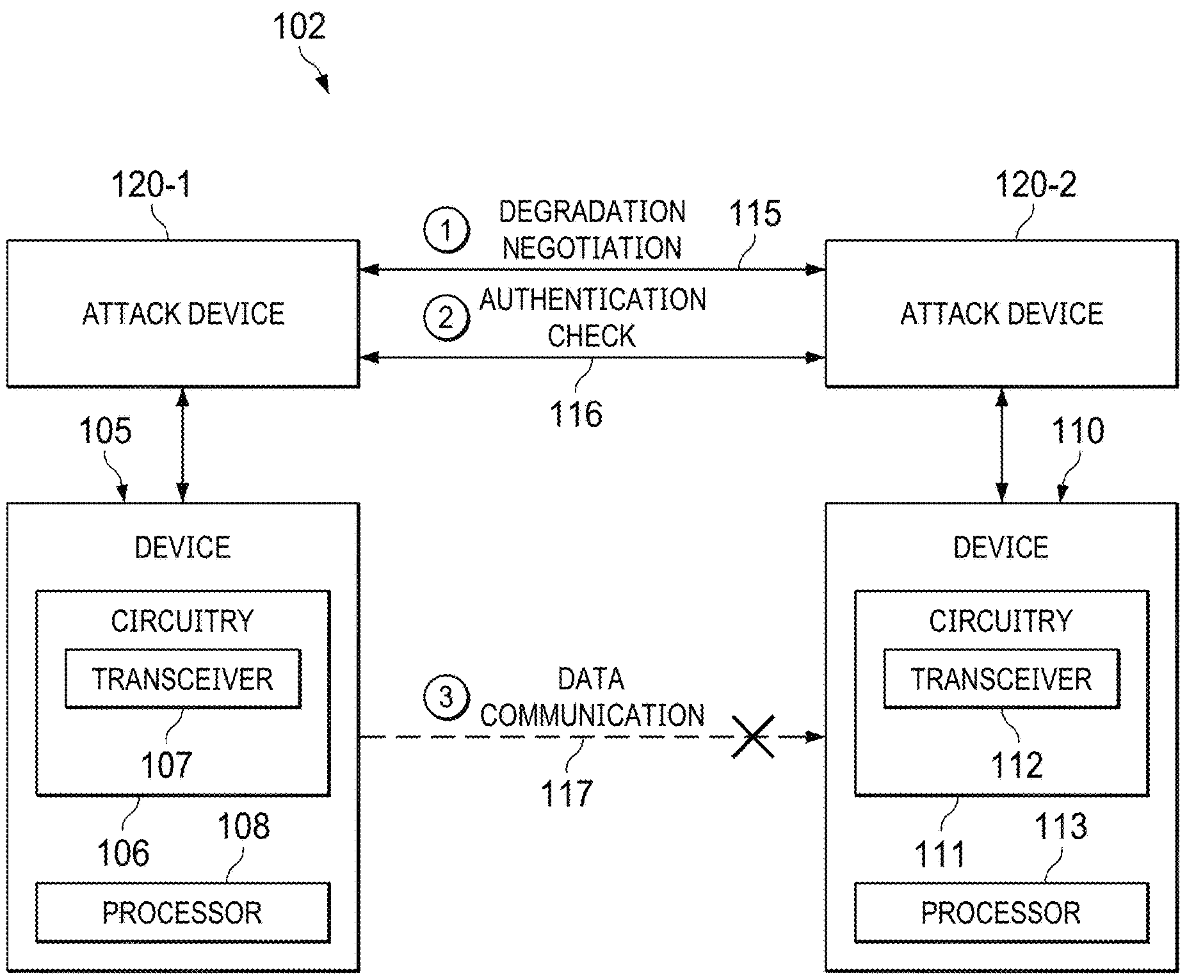

FIGS. 1A and 1B show block diagrams of a system, according to an embodiment of the present disclosure. FIG. 1A includes operating environment 101, which includes device 105, device 110, and components thereof. FIG. 1B includes operating environment 102, which also includes device 105, device 110, and components thereof, and further includes attack devices 120-1 and 120-2. Device 105 includes circuitry 106 and processor 108. Device 110 includes circuitry 111 and processor 113. In various examples, devices 105 and 110 perform early commit late detect (ECLD) attack prevention processes, such as processes 200 and 210 of FIGS. 2A and 2B, respectively. Accordingly, devices 105 and 110 may execute such processes on hardware, software, firmware, or any combination or variation thereof.

Referring first to FIG. 1A, operating environment 101 is representative of an environment including device 105 and device 110 in wireless communication with each other. Device 105 may be representative of any device, apparatus, or system capable of transmitting and receiving signals to and from device 105 using a wireless communication protocol such as Bluetooth or BLE. For example, in some embodiments, device 105 may be a key fob or a smart phone. Similarly, device 110 may be representative of any device, apparatus, or system capable of transmitting and receiving signals to and from device 105 via the wireless communication protocol. In some embodiments, device 110 may be a vehicle, a hotel room keypad, or any other device configured to provide wireless access control. In some embodiments, the wireless communication between devices 105 and 110 uses gaussian frequency-shift keying (GFSK).

In various embodiments, devices 105 and 110 include components capable of establishing wireless communications between each other, performing actions based on signals received from each other, and preventing ECLD attacks. For example, device 105 includes circuitry 106 and processor 108, and device 110 includes circuitry 111 and processor 113.

Circuitry 106 and circuitry 111 may be representative of one or more hardware components capable of transmitting, receiving, and processing signals communicated over the wireless network. In some embodiments, examples of circuitry 106 and 111 may include communications equipment, antennas, transmit circuitry and receiver circuitry (e.g., a transceiver), logic devices, amplifiers and buffers, filters, analog-to-digital converters, and the like. Specifically, in such embodiments, circuitry 106 may include transceiver 107, and circuitry 111 may include transceiver 112. In some embodiments, additional circuitry may be included in or external to devices 105 and 110. For example, in some embodiments, devices 105 and 110 may include or use one or more antennas located externally to devices 105 and 110 (e.g., and respectively coupled to circuitry 106 and 111) to facilitate communications between device 105 and device 110.

Processors 108 and 113 may be representative of one or more processors or processing cores capable of controlling circuitry 106 and 111, respectively, and other aspects of devices 105 and 110, respectively. In some embodiments, each of processors 108 and 113 may be implemented as a generic or custom controller or processor coupled to a memory and capable of executing instructions stored in the memory. In some embodiments, examples of processors 108 and 113 may include one or more generic or custom microcontrollers, DSPs, general purpose central processing units, application specific processors or circuits (e.g., ASICs), and/or logic devices (e.g., FPGAs), as well as any other type of processing device, combinations, or variations thereof.

In operation, devices 105 and 110, via circuitry 106 and 111 and processors 108 and 113, may perform several communication phases to negotiate characteristics of the communications between each other, authenticate each other, and provide signals and other data to each other. A first communication phase may include a negotiation phase. A second communication phase may include an authentication phase. A third communication phase may include a data communication phase.

During a negotiation phase, devices 105 and 110 may perform degradation negotiation 115 where devices 105 and 110 agree on a signal quality for communications over the Bluetooth connection. Device 110 may initialize the degradation negotiation 115 by transmitting, via circuitry 111 (e.g., transceiver 112), a first signal to device 105 indicating a level of degradation to apply to a signal to be transmitted during authentication check 116. In some embodiments, processor 113 of device 110 may select the level of degradation based on the quality or capabilities of circuitry 111 of device 110. For example, processor 113 may select a level of degradation corresponding to an amount of distortion that one or more filters of circuitry 111 can filter out to identify whether a received signal is authentic or not authentic. For example, in some embodiments, device 105 or 110 selects a level of degradation that corresponds to a quality level that is lower than a maximum achievable communication quality between devices 105 and 110 but that is higher than a minimum communication quality to ensure that communication occurs between devices 105 and 110 without substantial errors (e.g., a bit error rate lower than a predetermined threshold). In response to receiving the first signal from device 110, device 105 may identify the level of degradation and transmit, via circuitry 106, an acknowledgement signal to device 110.

Next, device 110 may initiate an authentication phase to verify that device 105 is an authorized device and that subsequently received signals are authentic signals. During the authentication procedure, devices 105 and 110 can perform authentication check 116. Authentication check 116 may begin when device 110 (or device 105 in other examples) transmits an authentication message (e.g., a message with a sequence of bits known to both devices 105 and 110) to device 105. In some embodiments, the authentication message may be or include a round-trip time (RTT) packet (e.g., the RTT packet is sent by device 110 to device 105, received by device 105 and sent back by device 105 to device 110, and received by device 110, where the time between transmitting the RTT packet by device 110 and receiving the RTT packet by device 110 may be used to determine the distance between devices 105 and 110). Device 105 may receive the RTT packet during authentication check 116 and transmit a signal, including the known bits (or data based on the known bits), to device 110. Device 105, via circuitry 106 and processor 108, may intentionally distort the signal based on the level of degradation (i.e., transmit the signal with a lower signal quality relative to other signals (e.g., communicated by device 105 during degradation negotiation 115 and/or data communication 117)) before sending the signal to device 110 to prevent ECLD attacks. This may entail changing the phase of the signal, injecting noise into the message to increase the signal-to-noise ratio (SNR) or bit error rate (BER) of the signal, or by some other means.

Device 110 can receive the distorted signal, filter out the noise using circuitry 111, and determine whether the received signal is authentic or not authentic. This may entail determining the distance between devices 105 and 110 based on the arrival time (e.g., phase) of the received signal versus the transmittal time of the RTT packet from device 110 (e.g., a round trip delay (RTT) of the authentication message sent either from device 105 or device 110). In some examples, the distance may include a threshold distance range (e.g., 0 to 3 meters). If device 110 determines that the distance between devices 105 and 110 is outside the threshold distance range, device 110 may determine that the received signal is not authentic and may not perform an action. However, if device 110 determines that the distance between devices 105 and 110 is within the threshold distance range, device 110 may determine that the received signal is authentic and may perform an action. In some examples, determining whether the received signal is authentic or not authentic may, instead or in addition, entail determining an amount of distortion of the received signal, the BER value of the received signal, and/or the phase of the received signal. If the amount of distortion, BER value, or phase of the received signal exceeds a respective threshold value, device 110 may determine that the received signal is not authentic.

By way of example, in some embodiments, device 110 may be a vehicle and device 105 may be a key fob (or a smart phone or other device acting as a key fob). Based on the time of arrival (e.g., phase) of the authentication message received by device 110 from device 105 during authentication check 116, device 110 may determine the proximity between the devices. If device 105 is closer than a predetermined threshold (e.g., 1 meter) from device 110, device 110 may take an action, such as unlock the vehicle, enable an unlocking capability of the vehicle, e.g., upon pressing a button in a handle of the vehicle, etc.

Following authentication of device 105, devices 105 and 110 may perform data communication 117 during a communication phase. Data communication 117 may include transmission of data and other signals from device 105 to device 110. In some embodiments, data communication 117 between devices 105 and 110 may occur continuously or irrespectively with regard to authentication check 116. Regardless of how and when data communication 117 occurs, device 105 may transmit signals during data communication 117 with higher signal quality relative to the signal transmitted during authentication check 116. In other words, during this communication phase, device 105 may not intentionally distort signals based on the negotiated level of degradation. Thus, the signals transmitted during the communication phase may have decreased noise, and BER values, and increased SNR values relative to signals transmitted during the authentication phase.

Referring next to FIG. 1B, operating environment 102 is representative of an environment including device 105, device 110, and attack devices 120-1 and 120-2 (collectively referred to as attack devices 120) whereby attack devices 120 attempt to wirelessly communicate with devices 105 and 110 to perform an ECLD attack on device 110.

Attack devices 120 may be representative of any device, apparatus, or system capable of communicating with devices 105 and 110 and with each other. In various examples, attack devices 120 may be referred to as a man in the middle (MITM) device that can manipulate the communication between devices 105 and 110 and cause device 110 to receive the authentication message during authentication check 116, where the authentication message appears to arrive earlier than what it would have without the actions of attack devices 120. In such examples, attack device 120-1 may be positioned in proximity to device 105, while attack device 120-1 may be positioned in proximity to device 110. Attack devices 120-1 and 120-2 may be connected to each other via a physical cable or some other high-speed communication mechanism.

As shown in FIGS. 1A and 1B, scenario 102 is similar to scenario 101, but with attack devices 120 acting to relay/forward communications between devices 105 and 110. In scenario 102, devices 105 and 110 are far from each other and are outside Bluetooth communication range.

In operation, device 110 initiates degradation negotiation 115 between device 110 and device 105 via attack devices 120 (devices 105 and 110 are outside Bluetooth communication range). In some embodiments, this may entail device 110 providing a first signal to device 105 to agree upon a level of degradation and transmitting a signal indicating the identified level of degradation. In some embodiments, this may entail attack device 120-2 intercepting the signal indicating the identified level of degradation being transmitted by device 110. In any case, attack device 120-2 can provide the signal, via the physical link, to attack device 120-1. Attack device 120-1 may provide the signal to device 105. Device 105 can acknowledge the level of degradation and transmit an acknowledgement signal. In some examples, device 105 is not close enough to device 110 for this signal to reach device 110. However, attack device 120-1 can intercept this signal and relay it to device 110 via attack device 120-2.

Following degradation negotiation 115, attack devices 120 can attempt to perform authentication check 116 between device 105 and device 110 to attempt to gain access to device 110 via an ECLD attack. To begin the authentication phase, device 110 can transmit a signal including an RTT packet, which can be relayed from device 110 to device 105 if the two devices are not close enough to each other by attack devices 120. In response to receiving the RTT packet, device 105 can transmit an authentication signal with a signal quality based on the identified level of degradation. The signal quality may be a poor quality signal relative to other signals transmitted by device 105 during other phases. Attack device 120-1 can intercept the degraded signal, attempt to predict a sequence of bits of the degraded signal (in an attempt to replicate the signal transmitted by device 105), and transmit a signal to attack device 120-2 for further transmission to device 110. More particularly, in some embodiments, attack devices 120 begins transmitting "relayed" bits before receiving them (based on a prediction), and then make an adjustment (flip the bit) if the prediction was wrong. If, because of noise, device 120 determines that the prediction is wrong too late, then it needs to boost the flipped bit to recover from the bad prediction. The later the bad prediction is identified, the more boost the flipped bit needs, and the more distortion imparted to the signal, which makes it more recognizable.

Device 110 can receive a signal from attack devices 120 and determine whether the received signal is authentic or not authentic. Determining whether the received signal is authentic or not authentic may include determining an amount of distortion of the received signal, the BER value of the received signal, and/or the phase, or phase trajectory, of the received signal. If the amount of distortion, BER value, or phase of the received signal exceeds a respective threshold value, device 110 may determine that the received signal is not authentic. In addition, or instead, determining whether the received signal is authentic or not authentic may entail determining the distance between devices 105 and 110 based on the received signal. In this example including attack devices 120, device 110 may utilize any of the aforementioned methods to determine that the received signal is not authentic. For example, device 110 may determine that the round trip delay time between transmitting the authentication signal and receiving the returned signal is beyond a predetermined threshold value. The delay may occur based on the level of degradation applied to the signal by device 105 as attack device 120-1 may experience issues predicting and relaying the signal due to the poor signal quality. It follows that the distortion added to the signal may also influence the distortion, BER value, and/or phase of the signal copied by attack device 120-1. Thus, after determining that the received signal is not authentic, device 110 may not authorize access or perform an event. Device 110 may further terminate data communications 117 between device 105 in some examples.

By way of example, device 110 may be a vehicle parked in a driveway of a house, and device 105 may be at the master bedroom of the house (e.g., 20 meters away from device 110). Attack devices 120 may be split into two nodes, a first node (attack device 120-1) near the master bedroom of the house (near device 105) and a second node (attack device 120-2) near the vehicle (near device 110), where the two attack devices 120 are connected via a physical cable or some other high-speed communication mechanism. When attack devices 120 receive the authentication message from device 105 (e.g., using attack device 120-1), attack devices 120 may attempt to predict the next symbol and transmit the predicted symbol to device 110 (e.g., using attack device 120-2), thereby causing device 110 to receive the authentication message earlier than the time the authentication message would have arrived without attack devices 120. Therefore, based on the shortened time of arrival, device 110 can determine that an ECLD attack has occurred and refuse to perform an action, such as unlocking one or more doors of the vehicle.

It may be appreciated that some examples including different systems or devices may be contemplated within this disclosure. For example, device 105 may be a hotel key, and device 110 may be a hotel room keypad. Devices 105 and 110 can employ the described techniques to prevent ECLD attacks from attack devices 120 attempting to gain unauthorized access.

Figure 2A:
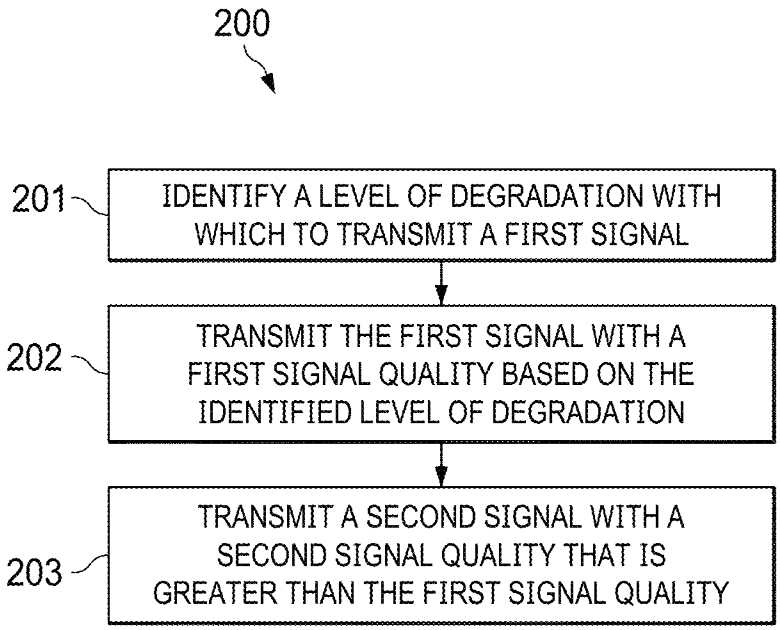
FIGS. 2A and 2B show methods for communicating signals of varying qualities between elements of a system, according to an embodiment of the present disclosure.
Figure 2B:
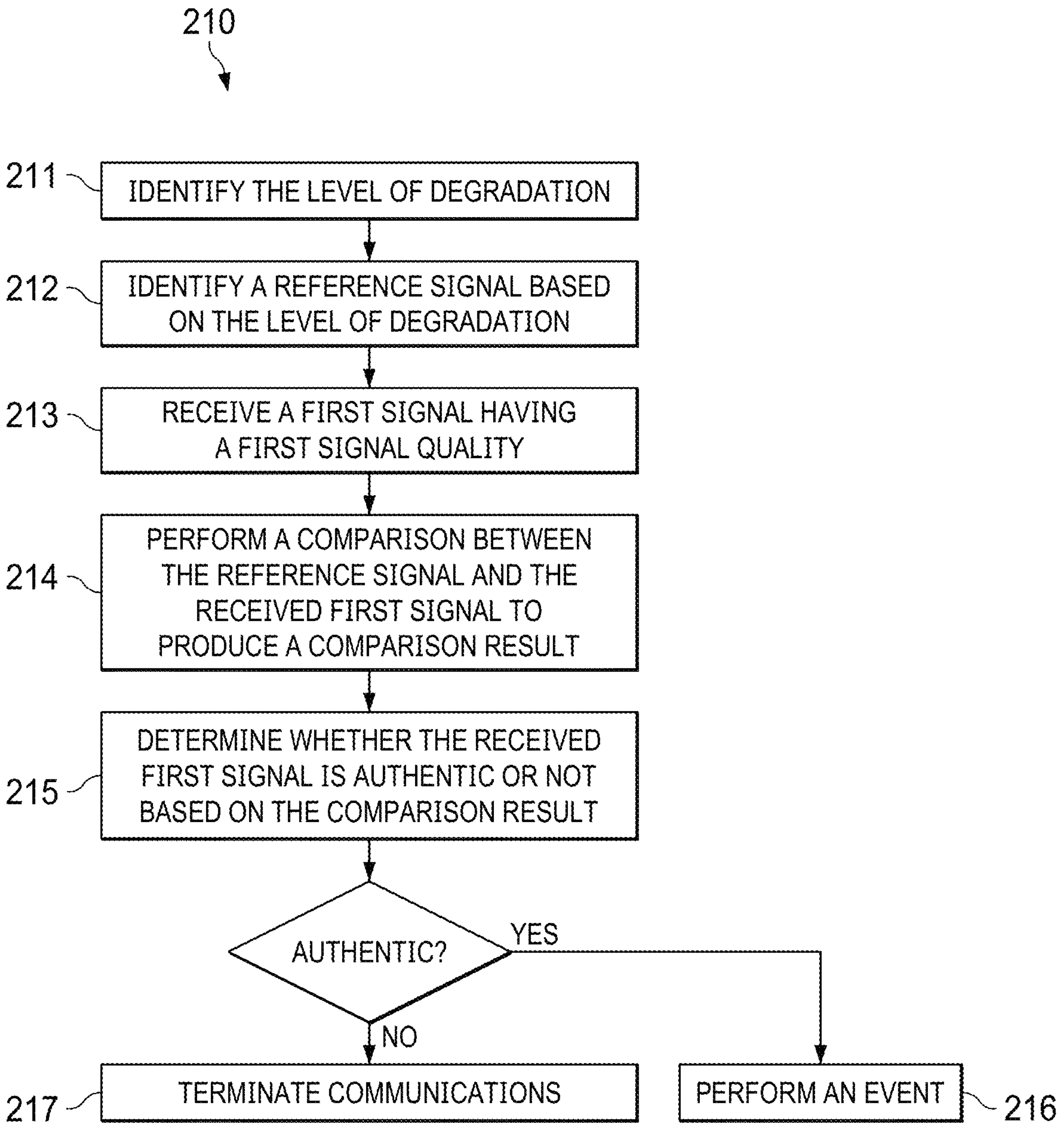

FIGS. 2A and 2B show methods for communicating signals of varying qualities between elements of a system to prevent ECLD attacks, according to an embodiment of the present disclosure. FIG. 2A includes process 200, and FIG. 2B includes process 210. Both processes 200 and 210 reference elements of operating environments 101 and 102 of FIGS. 1A and 1B, respectively. In various examples, processes 200 and 210 may be implemented in software, hardware, firmware, or any combination or variation thereof.

Referring first to FIG. 2A, process 200 may include a series of steps taken, e.g., by device 105, or from the perspective of device 105, during different communication phases occurring between device 105 and device 110.

In operation 201, device 105, via processor 108 of device 105, identifies a level of degradation with which to transmit an authentication signal to device 110 during a negotiation phase. The level of degradation may be selected based on the capabilities of device 105, such as the hardware capabilities of device 105. In some embodiments, level of degradation is identified during design or manufacturing of device 105 and such level of degradation may be stored in non-volatile memory of device 105. In some embodiments, the level of degradation is selected based on the capabilities of device 110 (which may be received via a message), in addition to the capabilities of device 105. For example, in some embodiments, the level of degradation may be selected as the worst degradation tolerated by both devices 105 and 110.

During the negotiation phase, devices 105 and 110 may agree on a signal quality for communications over the Bluetooth connection. In some examples, device 105 may initiate the negotiation phase. In some examples, device 110 may transmit a first signal to device 105 indicating a level of degradation to apply to a signal to be transmitted during an authentication phase. Processor 113 of device 110 may select the level of degradation based on the quality or capabilities of circuitry 111 of device 110 and/or circuitry 106 of device 105. For example, processor 113 may select a level of degradation corresponding to an amount of distortion that one or more filters of circuitry 111 can filter out to identify whether a received signal is authentic or not authentic. In response to receiving the first signal from device 110, device 105 may identify the level of degradation and transmit, via circuitry 106, an acknowledgement signal to device 110.

In operation 202, device 105, via circuitry 106 (e.g., transceiver 107), transmits the authentication signal with a first signal quality based on the identified level of degradation. In various examples, device 105 may send the authentication signal in response to receiving an RTT packet sent from device 110. The authentication signal may include an authentication packet with a series of bits known to both device 105 and device 110. Device 105 may intentionally inject noise or otherwise degrade the quality with which it transmits the packet (e.g., based on the selected level of degradation identified during step 201), e.g., so that a MITM (e.g., attack devices 120) cannot reproduce the authentication signal sufficiently earlier and/or without substantial distortion. Degrading the signal may entail changing the phase or phase trajectory of the signal, injecting noise into the message to decrease the signal-to-noise ratio (SNR) or increase the bit error rate (BER) of the signal, or by some other means.

Device 110 can receive the distorted authentication signal, filter out the noise using circuitry 111, and determine whether the received signal is authentic or not authentic. This may entail determining the distance between devices 105 and 110 based on the arrival time (e.g., phase) of the received signal versus the transmittal time of the RTT packet from device 110 (e.g., a round trip delay (RTT) of the authentication message sent either from device 105 or device 110). In some examples, the distance may include a threshold distance range (e.g., 0 to 3 meters). If device 110 determines that the distance between devices 105 and 110 is outside the threshold distance range, device 110 may determine that the received signal is not authentic and may not perform an action. However, if device 110 determines that the distance between devices 105 and 110 is within the threshold distance range, device 110 may determine that the received signal is authentic and may perform an action, such as initializing a data communication phase with device 105. In addition to the distance, device 110 may determine that the signal is not authentic based on the BER (e.g., BER higher than a predetermined threshold), a change in phase during transmission of the RTT packet, and/or an SNR lower than a predetermined threshold.

In operation 203, during the data communication phase, device 105 may transmit a data signal with a second signal quality that is greater than the first signal quality of the authentication signal. The data signal may include a data packet unrelated to the authentication between devices 105 and 110. In some examples, devices 105 and 110 may exchange data signals periodically, continuously, or at any time before and/or after the authentication phase. However, device 105 may transmit the authentication signals with degraded signal quality relative to the data signals. It follows that, in some embodiments, device 105 may not inject noise into the data signals transmitted before or after the authentication phase, such that the data signals are transmitted with higher quality than the authentication signals.

Referring next to FIG. 2B, process 210 may represent a series of steps taken by device 110, or from the perspective of device 110 during different communication phases occurring between device 105 and device 110.

In operation 211, device 110 identifies a level of degradation that device 105 may use to transmit an authentication signal during an authentication phase (e.g., based on a message received from device 105). The level of degradation may correspond to a signal quality of the communication transmitted from device 105 to device 110. In various examples, device 110 may determine the level of degradation based on capabilities of circuitry 111 to filter out an amount of distortion and noise corresponding to the level of degradation and/or based on capabilities of circuitry 105 to produce distorted signals based on the level of degradation. In some examples, device 110 may provide the level of degradation to device 105 (e.g., via a message during the degradation negotiation).

In operation 212, device 110 identifies a reference signal based on the level of degradation selected. The reference signal includes an authentication packet (or a portion thereof) having a sequence of bits. The sequence of bits may be known to both device 110 and device 105 used for authentication purposes. Device 110 may use the reference signal to compare incoming authentication signals to determine whether any received authentication signals are authentic or not. In some embodiments, the reference signal includes a degradation based on the selected degradation level. For example, device 110 determines a reference signal based on the sequence of bits and the level of degradation selected, e.g., such that the reference signal is a degraded sequence of bits (e.g., a digital representation of an analog signal that encodes the sequence of bits, where the analog signal is degraded based on the selected level of degradation.

Next, in operation 213, device 110 receives a first signal having a first signal quality. The first signal may refer to an authentication signal including the authentication packet. In some examples, the first signal may include an RTT packet. In some examples, the first signal may be transmitted by device 105. However, in some examples, the first signal may be transmitted by another device, such as a MITM like one of attack devices 120, e.g., forwarding the signal transmitted by device 105.

In operation 214, device 110 performs a comparison between the reference signal and the received first signal to produce a comparison result. In various examples, device 110 can filter out noise and distortion of the received first signal before making the comparison, and then identify whether the sequence of bits of the received first signal matches the sequence of bits of the reference signal. In some examples, comparing the received signal with the reference signal comprises performing a correlation operation. In some embodiments, a correlation operation is performed between the reference signal and the received first signal, where the comparison result is indicative of a deviation of the first signal from the reference signal.

In some example, instead of comparing the received signal with a reference signal, the received signal is compared with a predetermined metric (e.g., based on the selected degradation level). For example, in some embodiments, a BER of the received signal is compared with a predetermined BER threshold (e.g., based on the selected degradation level) to produce a comparison result. In some embodiments, an SNR of the received signal is compared with a predetermined SNR threshold (e.g., based on the selected degradation level) to produce a comparison result. In some such embodiments, the step of generating the reference signal may be replaced with generating the (e.g., BER, SNR) threshold.

Based on the comparison result, device 110, in operation 215, may determine whether the first received signal is authentic or not authentic. Determining whether the received signal is authentic or not authentic may include determining an amount of distortion of the received signal, the BER value of the received signal, and/or the phase, or phase trajectory, of the received signal. If one or more of the amount of distortion, BER value (e.g., even if the errors are recoverable), or phase of the received signal exceeds a respective threshold value, device 110 may determine that the received signal is not authentic. For example, a signal with too much distortion or incorrect sequencing of the bits may indicate an attack signal, or a signal that is not authentic. In addition, or instead, determining whether the received signal is authentic or not authentic may entail determining the distance between devices 105 and 110 based on the received signal. In some examples, device 110 may determine a threshold distance value. Device 110 can compare the determined distance to the threshold distance value, and based on the comparison result, determine whether the received signal is authentic or not authentic. This distance determination process may occur before, after, or simultaneously with the authentication process.

In some embodiments, device 110 may detect a change of phase during reception of the authentication packet (e.g., during reception of the sequence of bits). Such change of phase may be indicative of an attack and may result in device 110 determining that the device is not authentic (e.g., during step 215). In some such embodiments, generation of the reference signal (e.g., during step 212) and generating the comparison result (e.g., during step 214) may be omitted. In some embodiments, detection of the change of phase may be performed by performing a correlation between the received signal and the reference signal.

In operation 216, if device 110 determines that the received first signal is authentic, or in other words, is transmitted from device 105 within a threshold distance and/or with a threshold quality, device 110 may perform an action. By way of example, device 105 may be a smart phone and device 110 may be a vehicle, or a component thereof. If device 105 is close enough to device 110, and device 110 is able to decipher the authentication packet and detect that the authentication packet is authentic (i.e., device 110 does not detect anomalies (e.g., BER beyond a threshold, change of phase beyond a threshold, etc.)), then device 110 may unlock doors of the vehicle. If device 105 is close enough to device 110, but device 110 is not able to decipher the authentication packet (e.g., based on noise), then device 110 may not unlock doors of the vehicle and device 110 may instead proceed to operation 217.

However, in operation 217, if device 110 determines that the received first signal is not authentic, or in other words, is transmitted either from device 105 outside of the threshold distance or outside a threshold quality or from attack devices 120, device 110 may terminate communications and refuse to perform an action (e.g., unlocking action). For example, device 110 may determine that the received first signal is not authentic if the round trip delay time between transmitting the RTT packet and receiving the first signal is beyond a predetermined threshold value. In an example involving a MITM, such as attack devices 120, the delay may occur based on the level of degradation applied to the signal by device 105 as attack device 120-1 may experience issues predicting sequencing of the signal and relaying a predicted signal to device 110 due to the poor signal quality. It follows that the distortion added to the signal may also influence the distortion, BER value, and/or phase of the signal copied by attack device 120-1 or attack device 120-2, which in turn, may prevent unauthorized access to device 110.

Figure 3A:
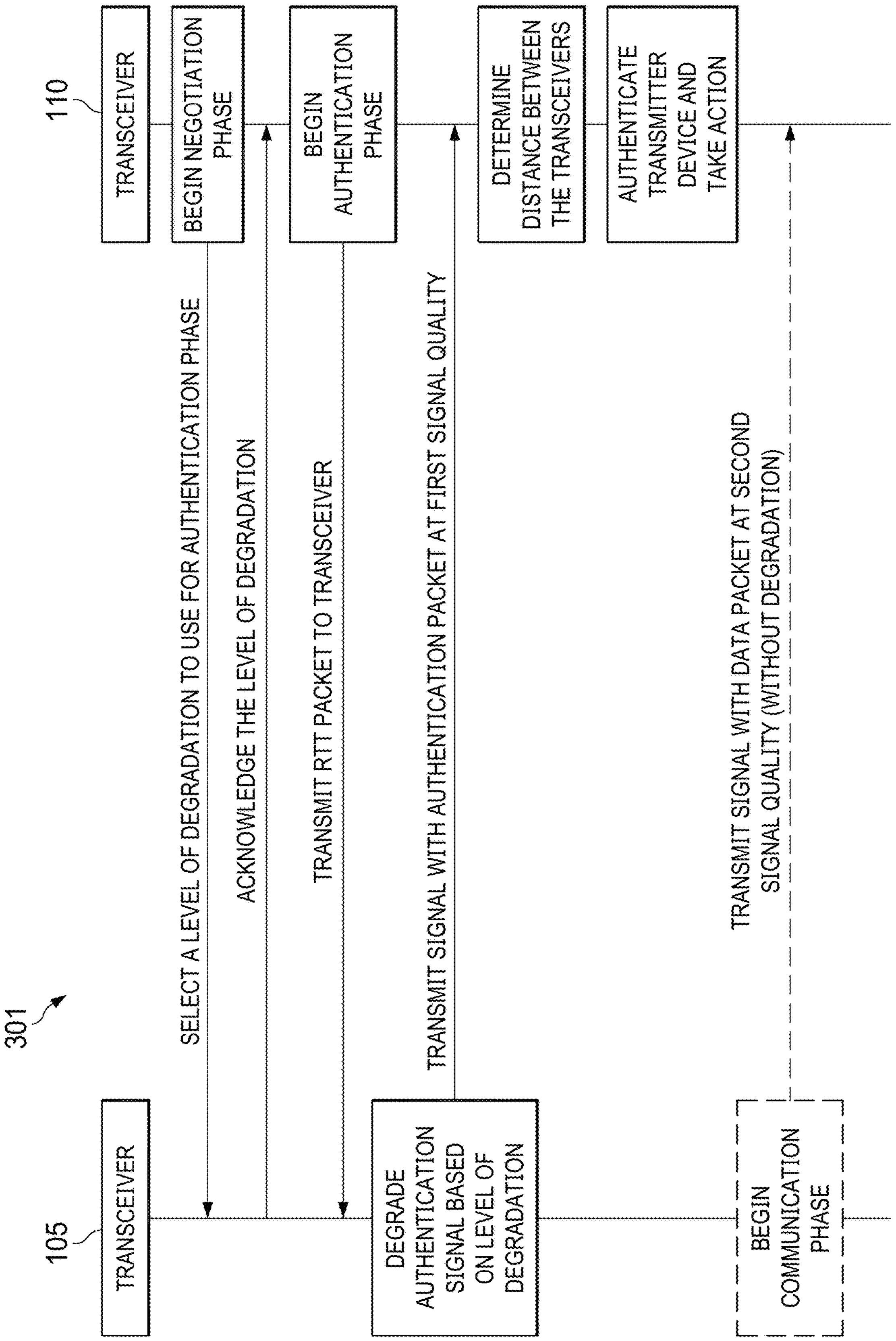
FIGS. 3A and 3B show sequence diagrams of a system, according to an embodiment of the present disclosure.
Figure 3B:
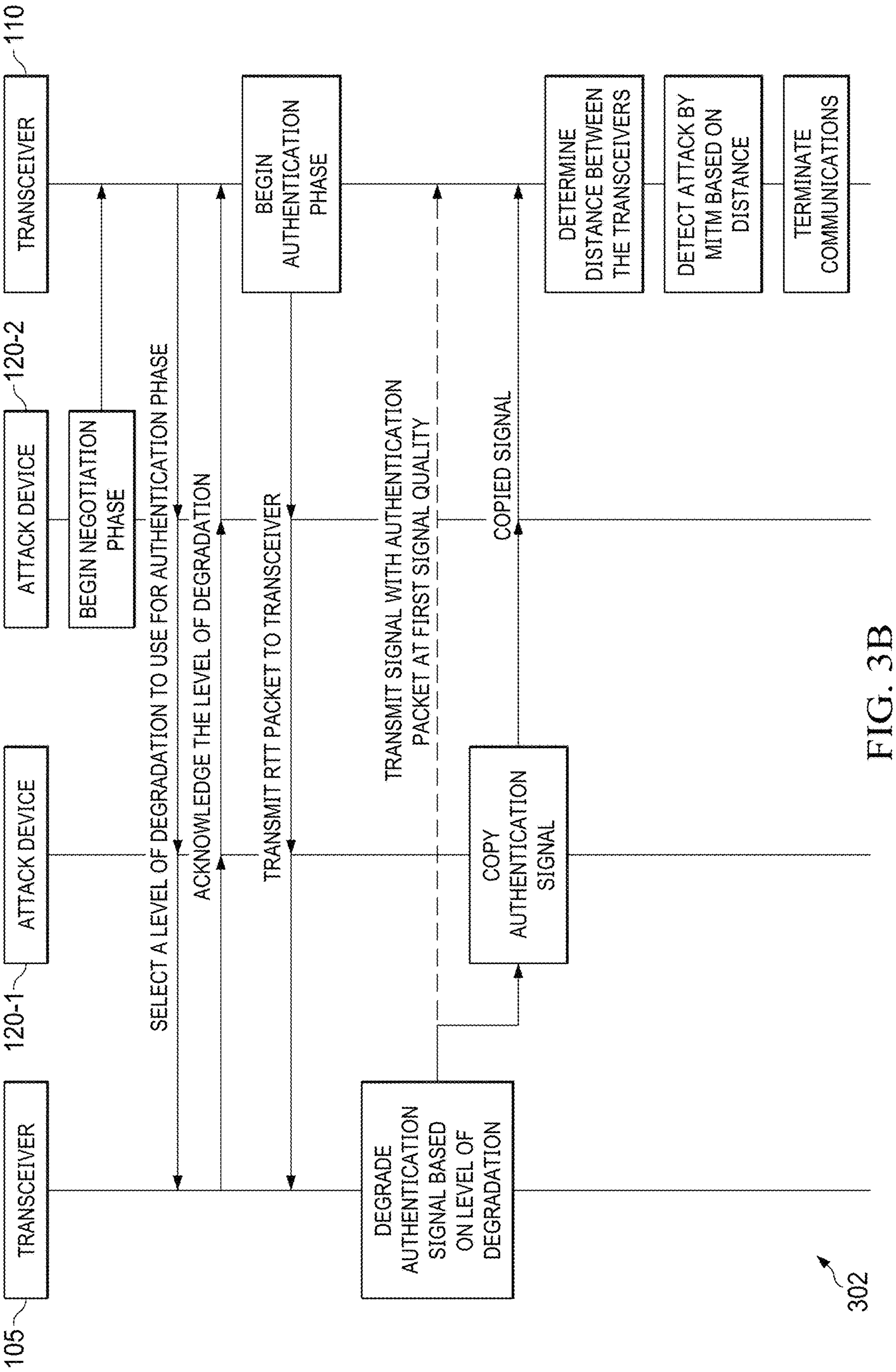

FIGS. 3A and 3B show sequence diagrams of a system, according to an embodiment of the present disclosure. FIG. 3A includes sequence 301, which references elements of operating environment 101 of FIG. 1A. FIG. 3B includes sequence 302, which references elements of operating environment 102 of FIG. 1B. Sequences 301 and 302 include a series of operations taken by elements of FIGS. 1A and 1B, respectively, which may correspond to steps of processes 200 and 210 of FIGS. 2A and 2B, respectively.

Referring first to FIG. 3A, sequence 301 includes a series of communications and events occurring between device 105 and device 110. Sequence 301 may begin when device 110 initiates a negotiation phase with device 105. During the negotiation phase, devices 105 and 110 may agree on a signal quality for communications over the Bluetooth connection. In some embodiments, device 110 may select or identify a level of degradation for use during a subsequent communication phase between devices 105 and 110. In some embodiments, device 105 may select or identify the level of degradation for use during the subsequent communication phase between devices 105 and 110. In the former embodiments, device 110 may then transmit a signal indicating the level of degradation to device 105. In response to identifying the level of degradation, device 105 may return an acknowledgement to device 110. In some of the latter embodiments, device 105 may transmit a signal indicating the level of degradation to device 110. In response to identifying the level of degradation, device 110 may return an acknowledgement to device 105.

Next, device 110 may initiate an authentication phase to verify that device 105 is an authorized device and that subsequently received signals are authentic signals within predetermined thresholds. During the authentication phase, device 110 (or device 105 in other examples) may transmit an authentication message (e.g., a message with a sequence of bits known to both devices 105 and 110) to device 105. In some embodiments, the authentication message may be a round-trip time (RTT) packet (e.g., the RTT packet is sent by device 110 to device 105, received by device 105 and sent back by device 105 to device 110, and received by device 110, where the time between transmitting the RTT packet by device 110 and receiving the RTT packet by device 110 may be used to determine the distance between devices 105 and 110).

Device 105 may receive the RTT packet during authentication check 116 and transmit a signal, including the known bits, to device 110. Prior to transmitting a return signal in response to the RTT packet, however, device 105, via circuitry 106 and processor 108, may intentionally degrade the signal based on the level of degradation (i.e., transmit the signal with a lower signal quality relative to other signals communicated during other communication phases) before sending the signal to device 110 to prevent ECLD attacks. Degrading the signal carrying the RTT packet may entail changing the phase or phase trajectory of the signal, injecting noise into the message to increase the signal-to-noise ratio (SNR) or bit error rate (BER) of the signal, or by some other means.

Device 110 can receive the distorted signal, filter out noise using circuitry 111, and determine whether the received signal is authentic or not authentic. This may entail determining an amount of distortion of the received signal, the BER value of the received signal, the phase or phase trajectory of the received signal, or the distance between devices 105 and 110 based on the arrival time (e.g., phase) of the received signal versus the transmittal time of the RTT packet from device 110 (e.g., a round trip delay (RTT) of the authentication message sent either from device 105 or device 110). In some examples, the distance may include a threshold distance range (e.g., 0 to 3 meters). If device 110 determines that the distance between devices 105 and 110 is outside the threshold distance range, device 110 may determine that the received signal is not authentic and may not perform an action. However, if device 110 determines that the distance between devices 105 and 110 is within the threshold distance range, device 110 may determine that the received signal is authentic and may perform an action. In some examples, if the amount of distortion, BER value, or phase of the received signal exceeds a respective threshold value, device 110 may determine that the received signal is not authentic.

Following the authentication of device 105, device 105 may begin a communication phase (if not already in progress) where device 105 transmits data signals without the degradation applied during the authentication phase.

Referring next to FIG. 3B, sequence 302 includes a series of communications and events occurring between device 105, device 110, and attack devices 120. In sequence 302, attack devices 120 may function as malicious MITM devices attempting to gain access to device 110.

Sequence 302 begins when device 105 initiates the negotiation phase with device 110. During the negotiation phase, device 105 may transmit a signal to device 110 to agree upon a level of degradation with which to transmit a signal between device 105 and device 110. In some embodiments, attack device 120-1 can intercept a signal indicating the identified level of degradation being transmitted by device 105. Attack device 120-1 can provide the signal, via a physical cable linking attack device 120-1 and 120-2, to attack device 120-2. Attack device 120-2 may provide the signal to device 110. Device 110 can acknowledge the level of degradation and transmit an acknowledgement signal, which may be transmitted from device 110 to attack device 120-2 and further to attack device 120-1 and device 105. In some embodiments, device 105 can, instead, acknowledge the level of degradation and transmit the acknowledgement signal to device 110 via attack devices 120.

Following degradation negotiation 115, attack devices 120 can attempt to gain access to device 110 via an ECLD attack. During an authentication phase, device 110 can transmit an RTT packet, which can be relayed (and possibly modified) from device 110 to device 105 if the two devices are not close enough to each other by attack devices 120. In response to receiving the RTT packet, device 105 can transmit an authentication signal with a signal quality based on the identified level of degradation. The signal quality may be a poor quality signal relative to other signals transmitted by device 105 during other phases. Attack device 120-1 can intercept the degraded signal, attempt to predict a sequence of bits of the degraded signal, and transmit a modified version of the signal to attack device 120-2 for further transmission to device 110.

Device 110 can receive the signal from attack device 120-2 and determine whether the received signal is authentic or not authentic. Determining whether the received signal is authentic or not authentic may include determining an amount of distortion of the received signal, the BER value of the received signal, the phase or phase trajectory of the received signal, or the distance between devices 105 and 110 based on the received signal. In this example including attack devices 120, device 110 may utilize any of the aforementioned methods to determine that the received signal is not authentic. For example, device 110 may determine that the round trip delay time between transmitting the authentication signal and receiving the returned signal is beyond a predetermined threshold value. The delay may occur based on the level of degradation applied to the signal by device 105 as attack device 120-1 may experience issues copying the signal due to the poor signal quality. It follows that the distortion added to the signal may also influence the distortion, BER value, and/or phase of the signal copied by attack device 120-1. Thus, after determining that the received signal is not authentic, device 110 may not authorize access or perform an event. Device 110 may further terminate data communications between device 105 in some examples.

Figure 4:
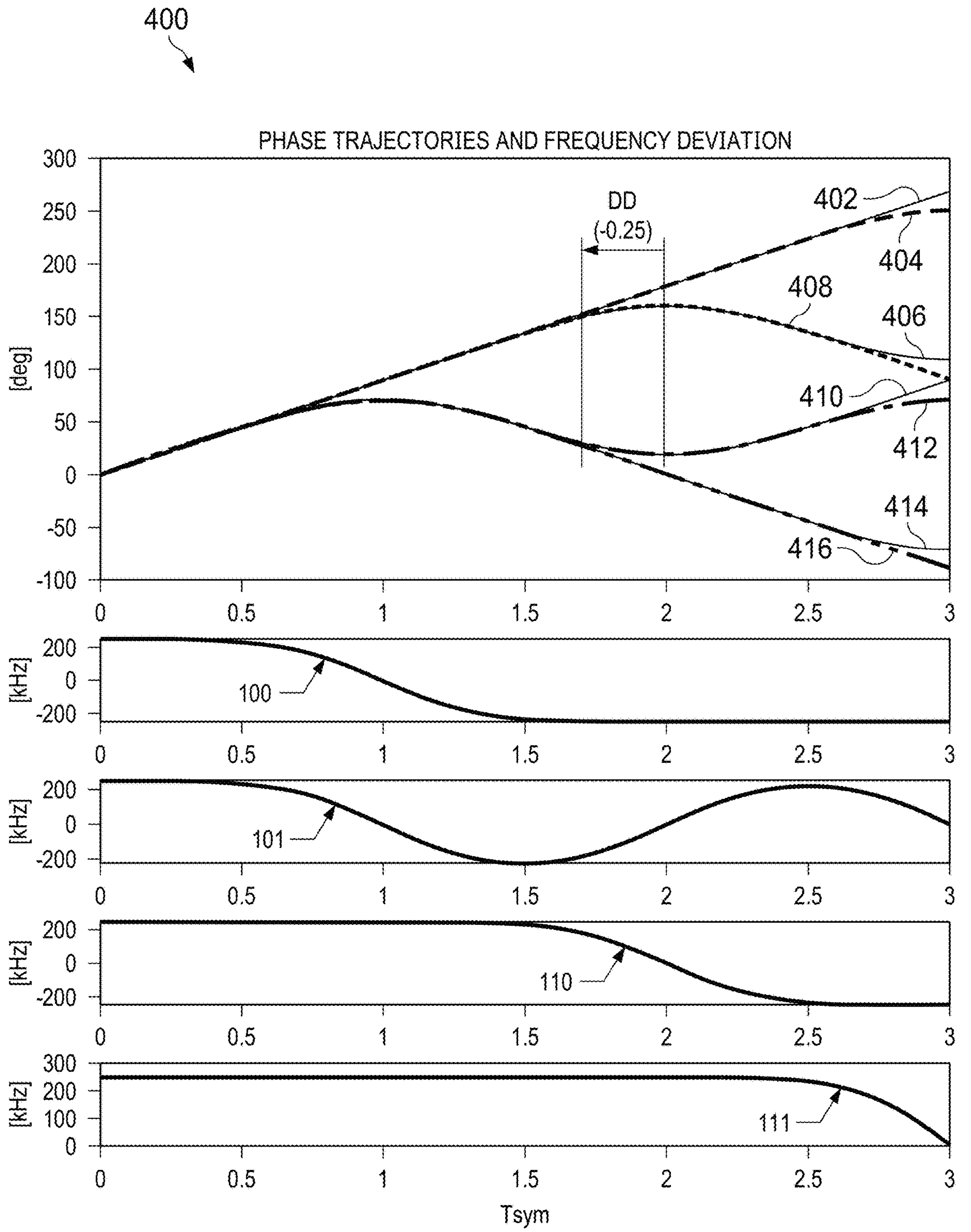
FIG. 4 shows phase trajectories and instantaneous frequency deviations of 3 symbol periods, according to an embodiment of the present disclosure.

FIG. 4 shows possible phase trajectories and instantaneous frequency deviations of 3 symbol periods, according to an embodiment of the present disclosure. Curve 402 represent symbols (1, 1, 1). Curve 404 represent symbols (1, 1, 0). Curve 406 represent symbols (1, 0, 1). Curve 408 represent symbols (1, 0, 0). Curve 410 represent symbols (0, 1, 1). Curve 412 represent symbols (0, 1, 0). Curve 414 represent symbols (0, 0, 1). Curve 416 represent symbols (0, 0, 0).

As shown in FIG. 4, the last of the three symbols of any of curves 402, 404, 406, 408, 410, 412, 414 and 416 may be predicted based on the phase of the signal at the detection delay (DD) period of the second symbol. The DD period, also referred to as the attack window, may be defined from the symbol boundary (e.g., zero-crossing) and may be a negative value if the bit can be detected based on the gaussian spreading into the previous bit. The signal (r(t)) may include a message (m(t)), which represents the signal in time, may each be defined by the following equations:

$$r(t)=\mathrm{R}\{e^{j(2\pi f_c t+m(t)+\phi_n(t))}\}+i(t)+n(t)$$

$$m(t)=\pi\int_{-\infty}^{t}\sum_{i=0}^{N-1}\alpha_i p(\tau-iT_s)d\tau$$

In the first equation, f may be a carrier value, m(t) may be the message, $\varnothing_n$ may be phase noise created by device 105, i(t) may be an interferer value, and n(t) may be noise received by device 110 or attack devices 120. In the second equation, α may represent symbols of the message, τ may represent the gaussian shape of the message, and $T_s$ may represent a period of the message.

As illustrated in FIG. 4, graphical representation 400 shows the signal in the top most portion that includes curves 402, 404, 406, 408, 410, 412, 414, an 416, and derivatives of the signal in the bottom four portions of the graph. The phase noise, or $\varnothing_n$ in the signal equation above, from device 105 may cause a shift to the right (a delay) to the attack window (making DD less negative, or more positive), which may result in more distortion in the signal received by device 110 a change (e.g., increase) in phase of the signal received by device 110.

Figure 5A:
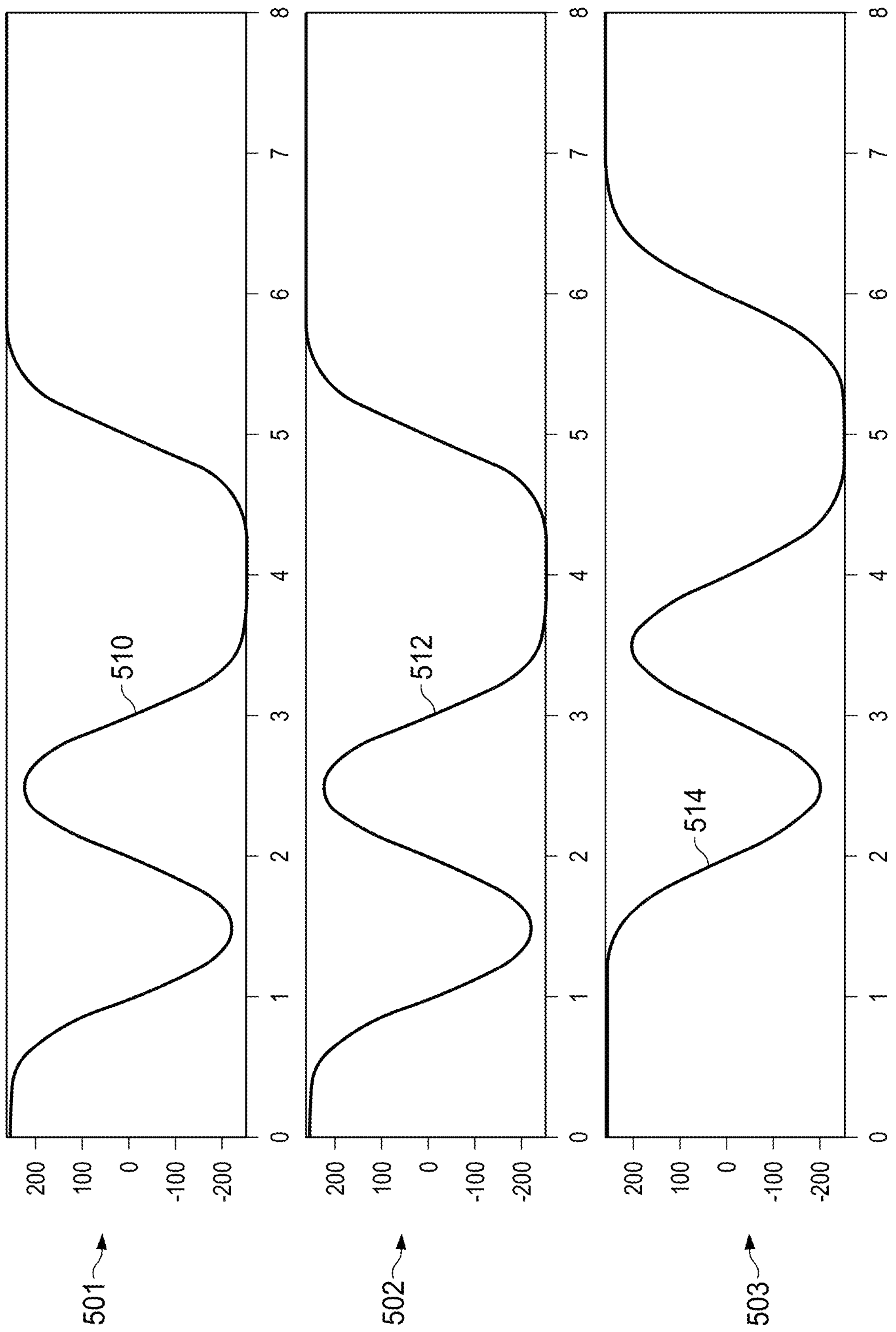
FIGS. 5A, 5B, and 5C show waveforms associated with devices of FIGS. 1A and 1B, according to embodiments of the present disclosure.
Figure 5B:
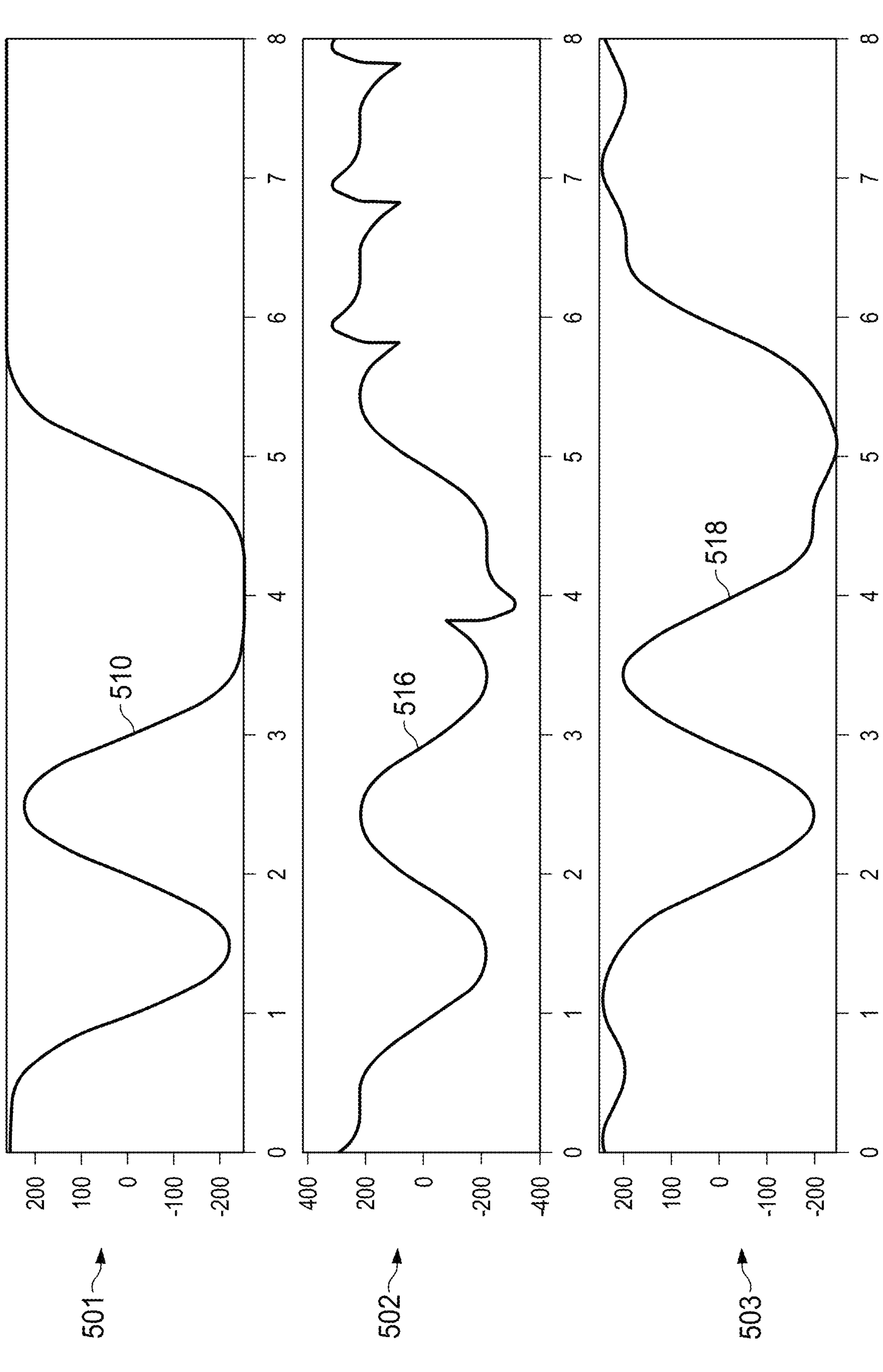
Figure 5C:
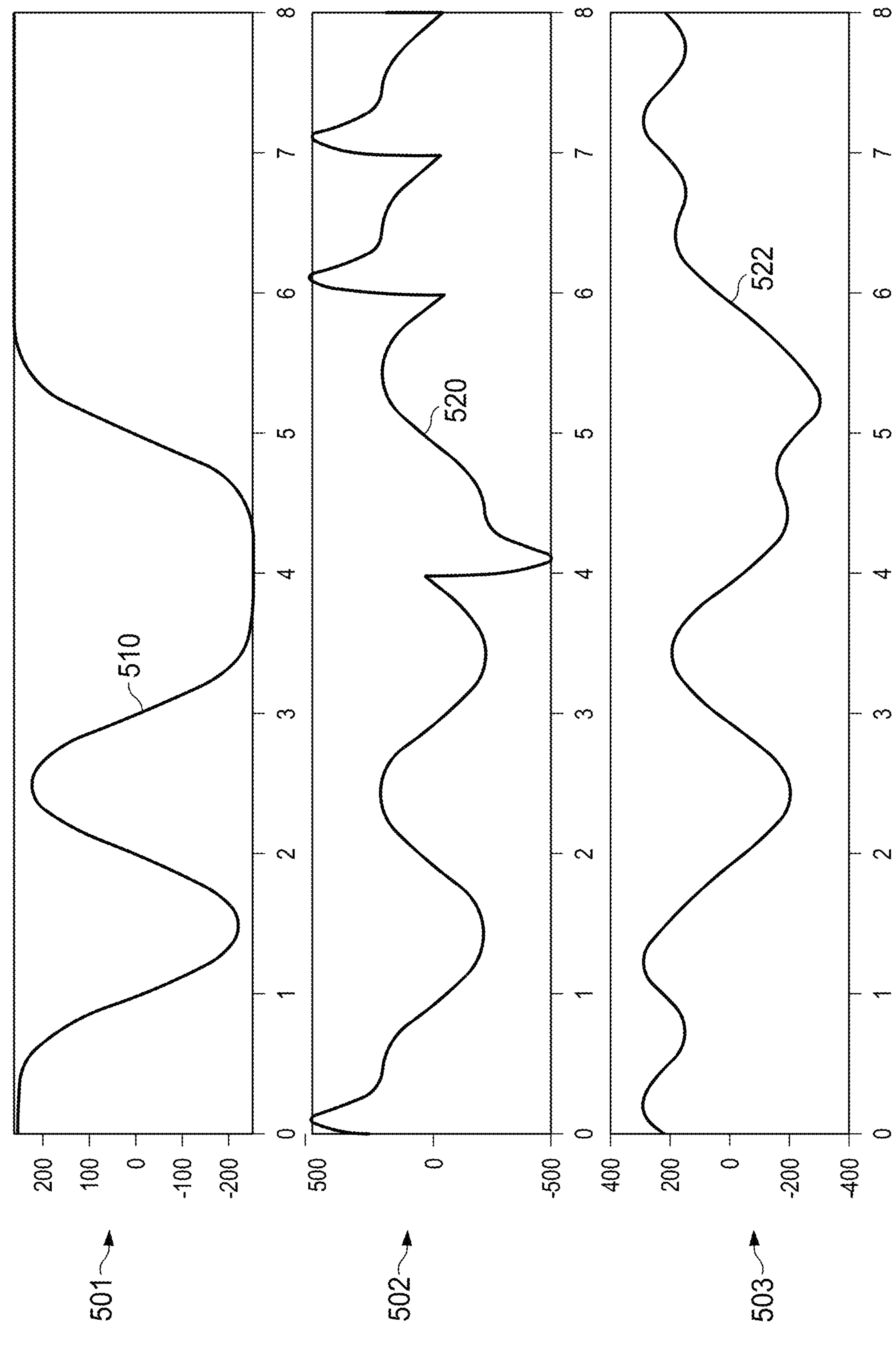

FIG. 5A shows graphical representations 501, 502, and 503, which include waveforms 510, 512, and 514, respectively, associated with device 105, attack devices 120, and device 110 of FIG. 1B, respectively, in an example where attack devices 120 do not make an attack. FIG. 5B shows graphical representations 501, 504, and 505, which include waveforms 510, 516, and 518, respectively, associated with device 105, attack devices 120, and device 110, respectively, in an example where attack devices 120 make an attack. FIG. 5C shows graphical representations 501, 506, and 507, which include waveforms 510, 520, and 522, respectively, associated with device 105, attack devices 120, and device 110, respectively, in an example where attack devices 120 make an attack. Each of the waveforms of FIGS. 5A, 5B, and 5C may represent derivatives of the message (m(t)) transmitted by device 105, transmitted by attack devices 120, and processed at device 110 (e.g., an internal signal of device 110 following filtering with a full-symbol latency filter), respectively.

Referring first to FIG. 5A, in some embodiments, waveform 510 includes a sequence of bits, such as "10100111" transmitted by device 105 to device 110. In the scenario illustrated in FIG. 5A, attack devices 120 intercepts the signal transmitted by device 105 and forwards such signal to device 110 without modifying the signal, as shown by waveform 510. Waveform 514 illustrates the signal received by device 110. As shown in FIG. 5A, waveform 514 may be shifted (e.g., due to the effect of filtering by device 110) and includes the same sequence of bits as waveforms 510 and 512, e.g., but with a single period delay as the zero-crossings of device 110 correspond to zero-crossings of device 105 (e.g., due to a full symbol latency filter).

In FIG. 5B, attack devices 120 may produce waveform 516 while attempting to predict the sequence of bits of waveform 510. In some embodiments, attack devices 120 may create the attack signal (waveform 516) from approximately 20 meters away from device 105 and with a detection delay (DD) of −0.16. As can be seen by comparing FIGS. 5A and 5B, waveform 518 (which illustrates the waveform received by device 110 after being modified by device 120) is shifted to the left with respect to waveform 512. As can be seen in FIG. 5B, the distortion introduced by attack devices 120 (e.g., by boosting the predicted signal to cause the shift in the waveform, as illustrates by waveform 516) may be filtered by device 110, thereby allowing device 110 to recreate the authentication message sent by device 105 without detecting substantial distortion, while the authentication message appears to arrive earlier, thereby causing device 105 appearing to be closer to device 110.

The longer it takes for attack devices 120 to predict the next symbol, the more distortion attack devices 120 introduce to cause the authentication message to arrive early. For example, FIG. 5C shows waveforms 510, 520, and 522 associated with device 105, attack devices 120, and device 110, respectively. FIG. 5C shows a scenario with a higher DD (compared to FIG. 5B) in which attack device is unable to detect the next symbol too early (e.g., due to increased noise). As a result, device 120 may detect a prediction error and correct such error at a later time. For example, FIGS. 5B and 5C show a symbol prediction error at about time 4 (prediction 1; actual symbol 0), which is corrected as soon as device 120 detects such error. Because device 120 detects such error at a later time in FIG. 5C with respect to FIG. 5B (e.g., DD is −0.16 in FIG. 5B versus 0 in FIG. 5C), more distortion is introduced at about time 4 in the scenario illustrated in FIG. 5C versus the scenario illustrated in FIG. 5B (see magnitude of flipping of symbol at about time 4 in waveform 520 versus waveform 514). Such distortion may become high enough (if DD is sufficiently high, such as 0 or positive, in some embodiments) so that it becomes perceivable and detectable after filtering in device 110 (see increased distortion in waveform 522 between about times 4 and about 5.4 versus distortion in waveform 518 between about times 4 and 5.4). In some embodiments, device 110 detects the distortion of waveform 520 and, in response, refuses to take action (e.g., does not authenticate device 105, even if device 105 appears to be near device 110).

In some embodiments, device 105 degrades the signal carrying the RTT packet (e.g., by injecting noise into the signal) to prevent device 120 from predicting the symbols early (thereby causing DD to be less negative, 0, or even positive, with respect to a non-degraded signal).

In some embodiments, device 105 dynamically (e.g., abruptly) changes the phase noise component $\emptyset_n$ (and, thus, the signal-to-noise ratio (SNR)) during transmission of a packet or message (e.g., during the RTT packet).

In some embodiments, a device (e.g., device 105) may have a transmitter capable of adjusting a SNR output within a given range for modulated transmissions. In some embodiments, there are seven different SNR levels, as shown in Table 1, and the device (e.g., device 105) may be capable of adjusting its SNR output to any of the seven levels.

TABLE 1

| SNR Output Index (SOI) | SNR Output Level (dB) |
|---|---|
| 0 | 18 |
| 1 | 20 |
| 2 | 22 |
| 3 | 24 |
| 4 | 26 |
| 5 | 28 |
| 6 | 30 |

In some embodiments, a device (e.g., 105 or 110) supports at least 1 of the SNR levels shown in Table 1 (e.g., level 3 may be mandatory, according to a protocol or standard), but may not support all of the levels. In some embodiments, a device (e.g., 105 or 110) may support of the SNR levels shown in Table 1. In some embodiments, during the negotiation phase, selecting or identifying a degradation level includes selecting a level from a predetermine list of possible levels, such as the 7 possible levels shown in Table 1.

In some embodiments, if $\hat{x}(k, t)$ is a continuous version of the observed CS_SYNC packet transmitted by the device (e.g., device 105) at step k, $\hat{\varphi}(k, t)$ is the phase of the observed $\hat{x}(k, t)$, the lowpass filter used for the reception of CS_SYNC packet transmitted by the device (e.g., device 105) may be considered wideband.

In some embodiments, the SNR control error may be computed by:

$$SNR_{TX}^{error}(k) = \left|SNR_{TX}^{desired} - SNR_{TX}(k)\right|$$

In some embodiments, device 105 changes the phase noise by changing the bandwidth of a phase-locked-loop (PLL) of a transmit path of device 105. For example, during a communication phase between devices 105 and 110, the bandwidth of the PLL of device 105 may be low at a first value, which may advantageously result in a low BER. During the authentication phase (e.g., during transmission of an authentication packet/message), the bandwidth of the PLL may be increased to a second value higher than the first value. Such increased bandwidth may result in an increase in phase noise, which may advantageously increase the chances of device 110 of detecting an attack by attack devices 120, or may make it difficult for attack devices 120 to carry out the attack. In some embodiments, the PLL of device 105 has the bandwidth equal to the second value during the entirety of the authentication phase. In some embodiments, the PLL of device 105 has the bandwidth equal to the second value during a portion of the authentication phase (at the beginning, or at the end), while the PLL has the first value (or another value different than the first value) during other portions of the authentication phase.

Figure 6:
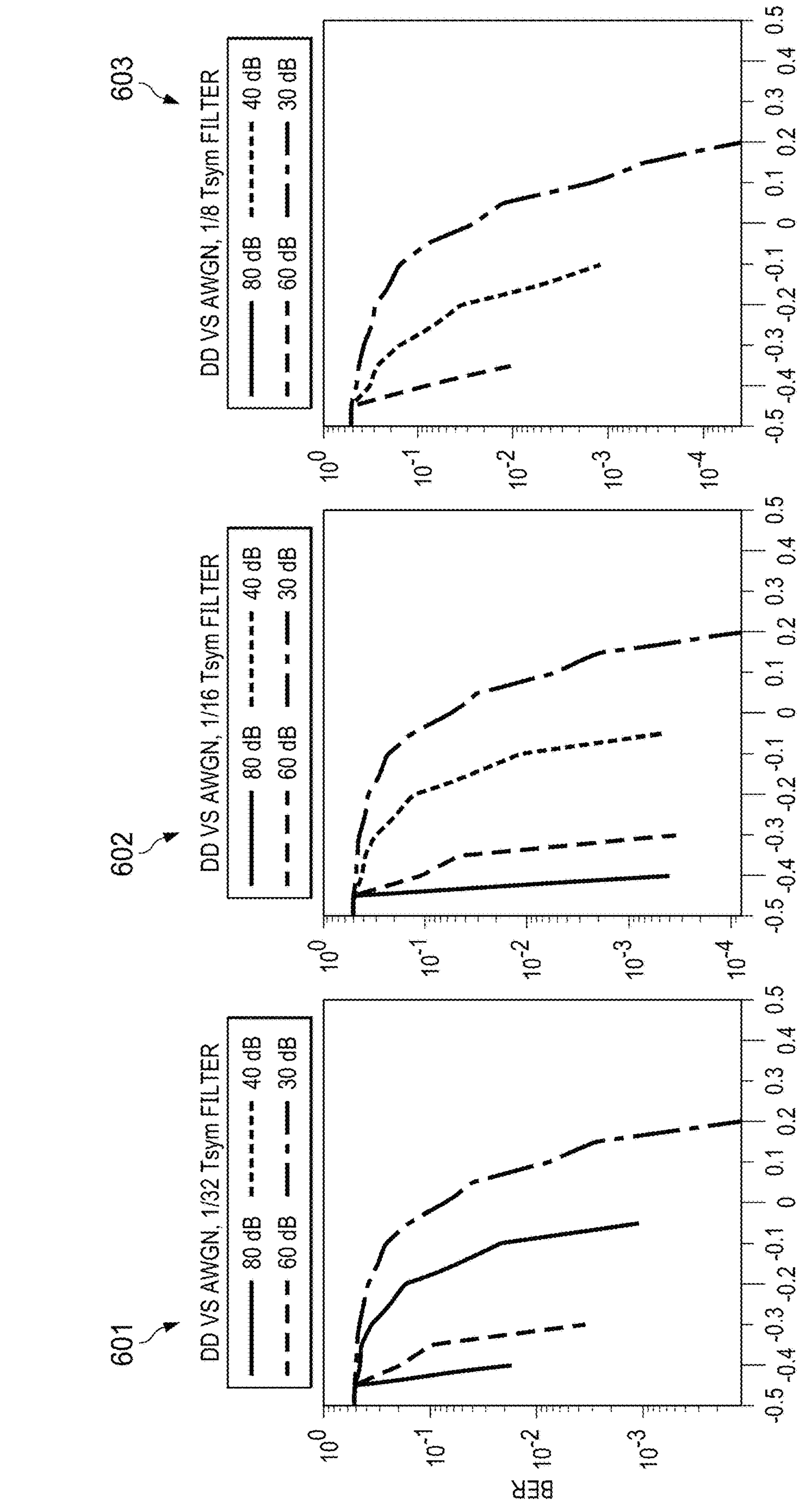
FIGS. 6 and 7 show bit error rate (BER) versus detection delay (DD) for different scenarios, according to embodiments of the present disclosure.
Figure 7:
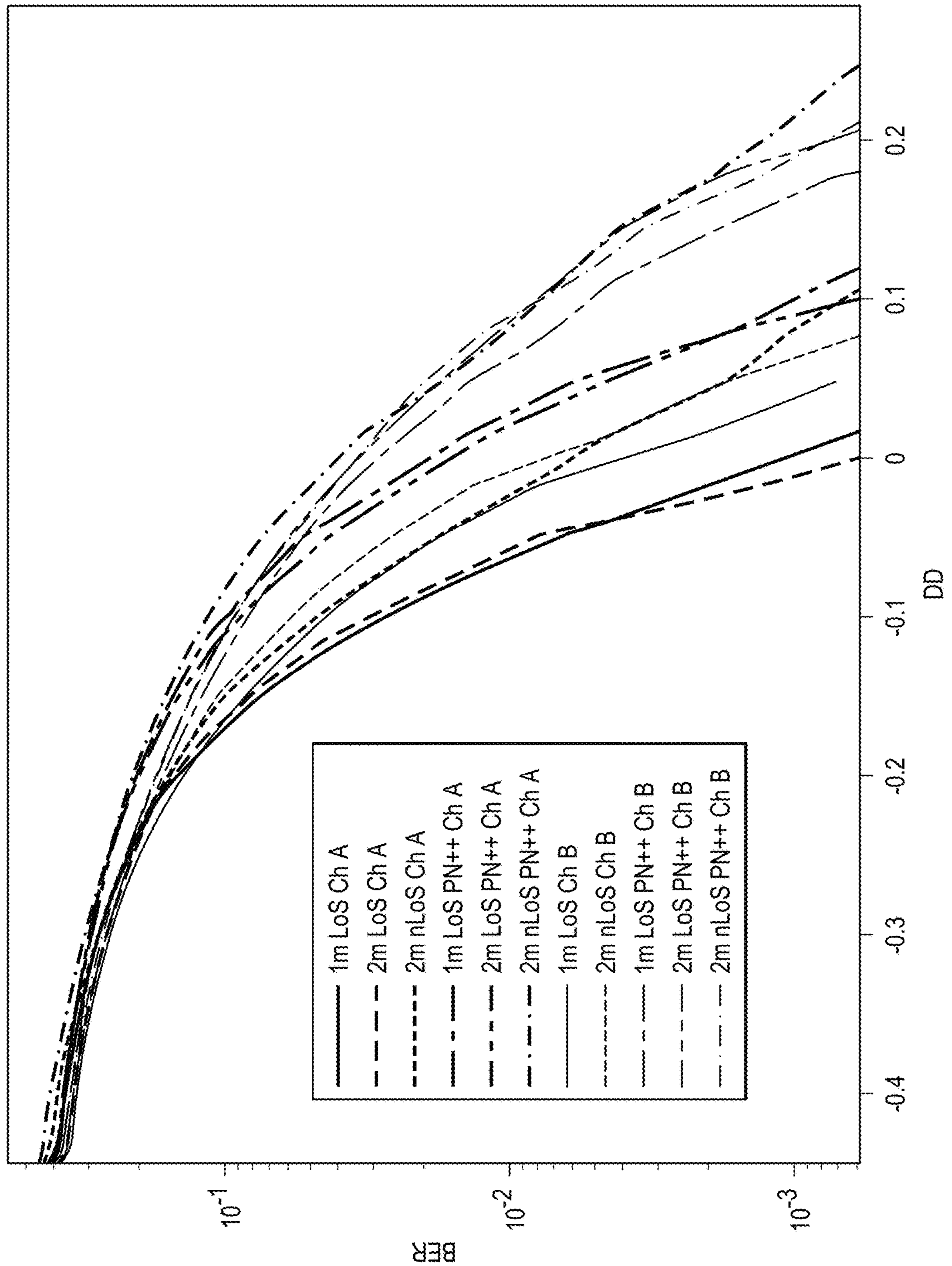

FIG. 6 shows simulations 601, 602, and 603 of bit error rate (BER) versus detection delay (DD) for different signal-to-noise ratios (SNR). FIG. 7 shows simulation 700 of bit error rate (BER) versus DD for different real device data captures, such as for different distances within line of sight (LoS) and for nonLoS (nLoS).

Based on, e.g., FIGS. 6 and 7, it follows that, in some embodiments:

- The best results for DD are for 1 m/2 m LoS captures on Ch A, which may represent a channel with good intrinsic phase noise characteristics in some embodiments;
- For the same channel and mode, nLoS captures are worse than LoS captures;
- Ch B, which may represent a channel with poorer intrinsic phase noise characteristics relative to Ch A, has visibly worse DD performance than Ch A;
- PN++ modes, which may represent one or more settings or modes that further degrade signal quality, such as by creating additional phase noise (PN), may always behave worse (higher DD) than normal modes;
- For BER 10-2 the bracket of valid DD values is between [−60 ns, +80 ns];
- For BER 10-3 the bracket of valid DD values is between [0 ns, +220 ns]; and TAD=DD+FD (30 ns in this case).

In some embodiments, degrading the transmitted signal quality (e.g., degrading the phase noise, BER, or SNR, for example) results in higher DD. This is illustrated, e.g., in FIGS. 6 and 7 with respect to BER. Since a higher DD may cause device 120 to introduce more distortion, which may be detectable by device 110, in some embodiments, degrading the transmitted signal quality may advantageously allow a device (e.g., 110) to detect an ECLD attack.

In some embodiments, increasing, by device 105, the phase noise may force attack devices 120 to adopt a higher DD and consequently make the attack more detectable.

Figure 8:
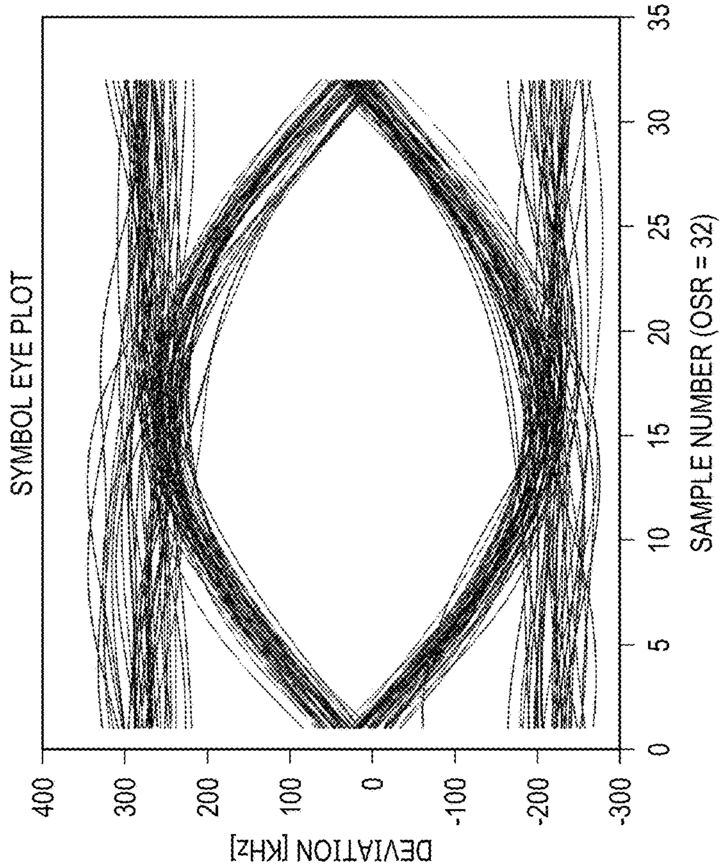
FIG. 8 shows eye diagrams associated with a device, according to an embodiment of the present disclosure.
Figure 8:
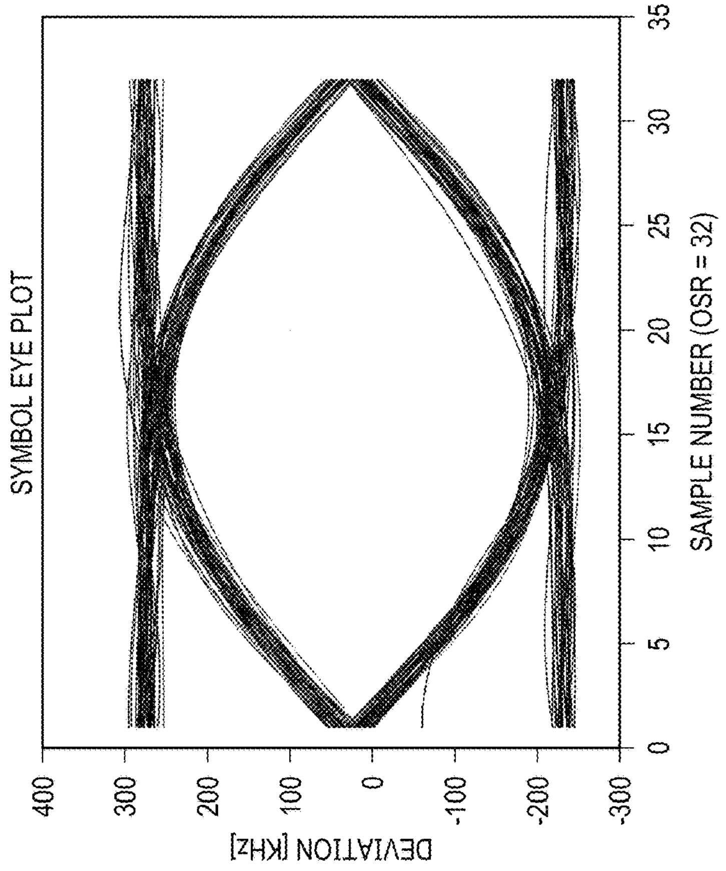
Figure 9:
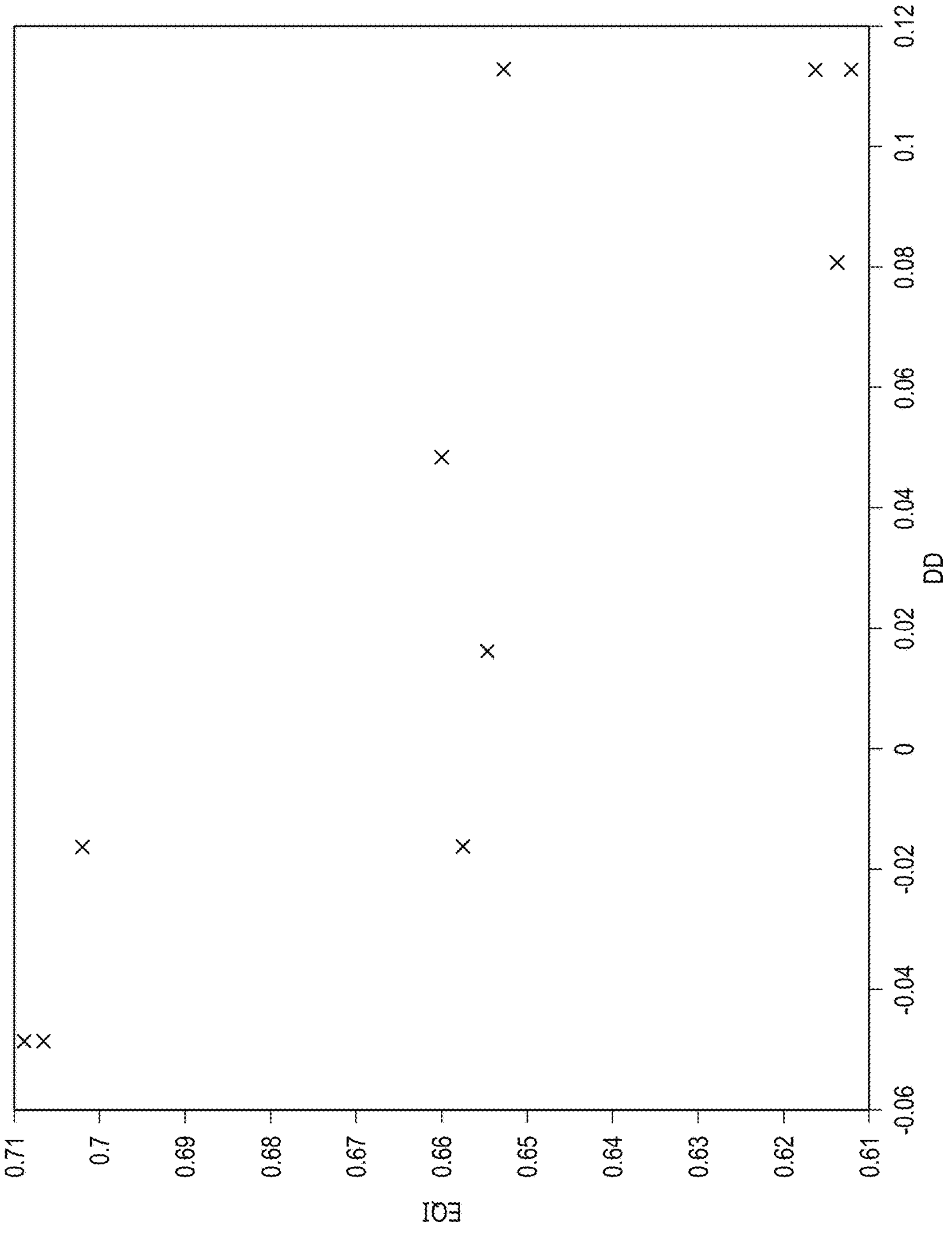
FIG. 9 illustrates a relationship between eye quality indication (EQI) and DD, according to an embodiment of the present disclosure.
Figure 10:
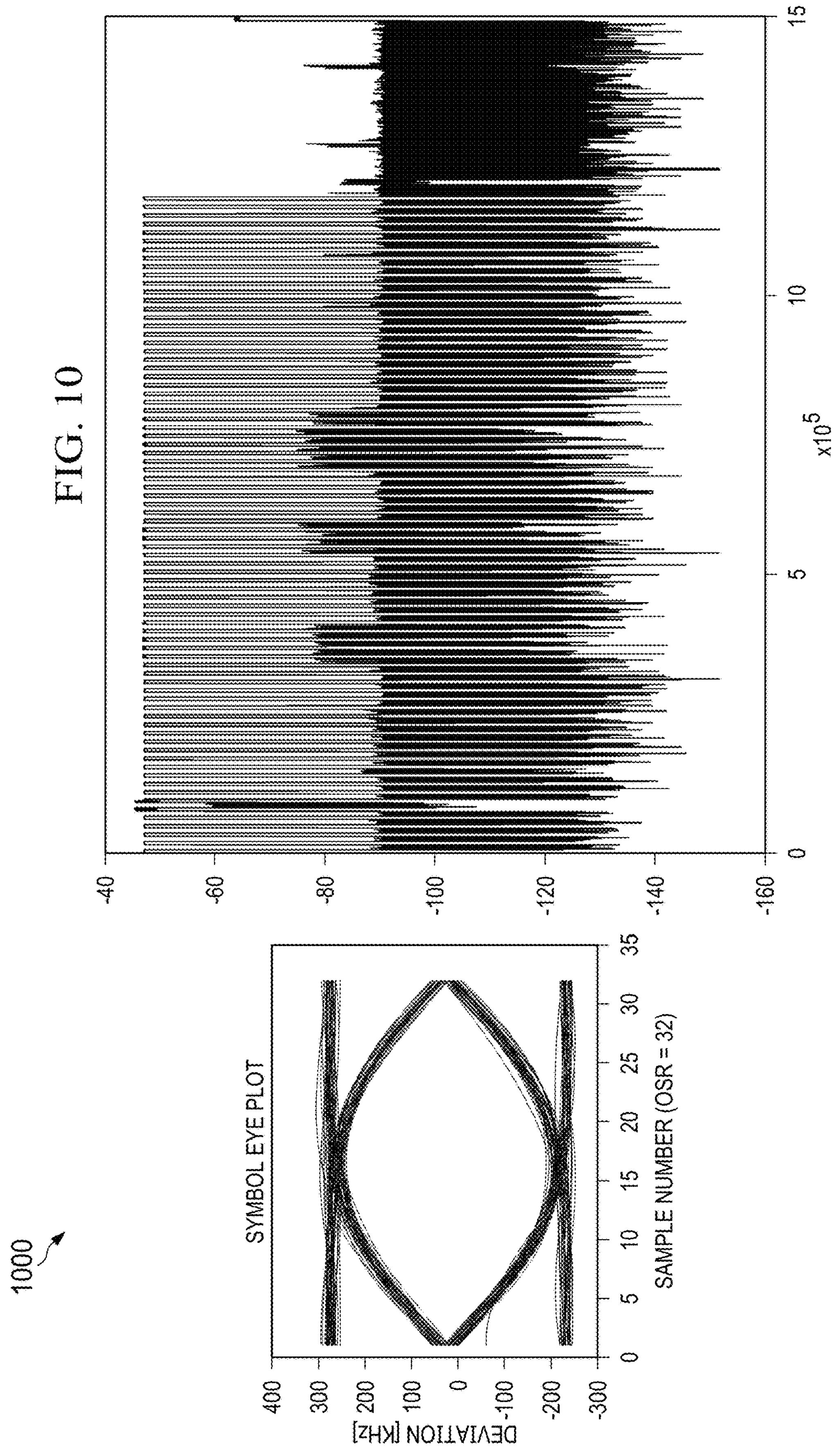
Figure 11:
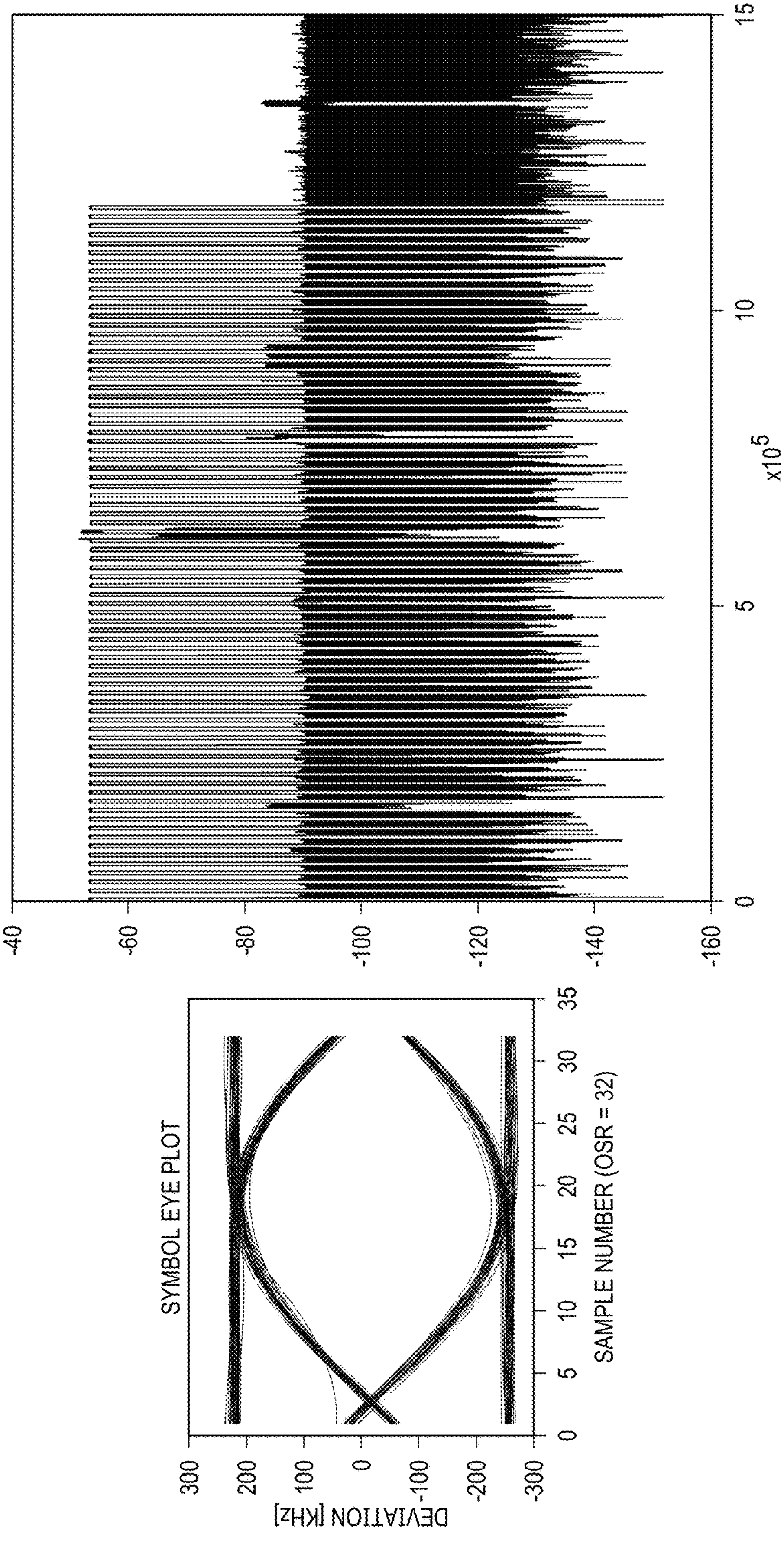
Figure 12:
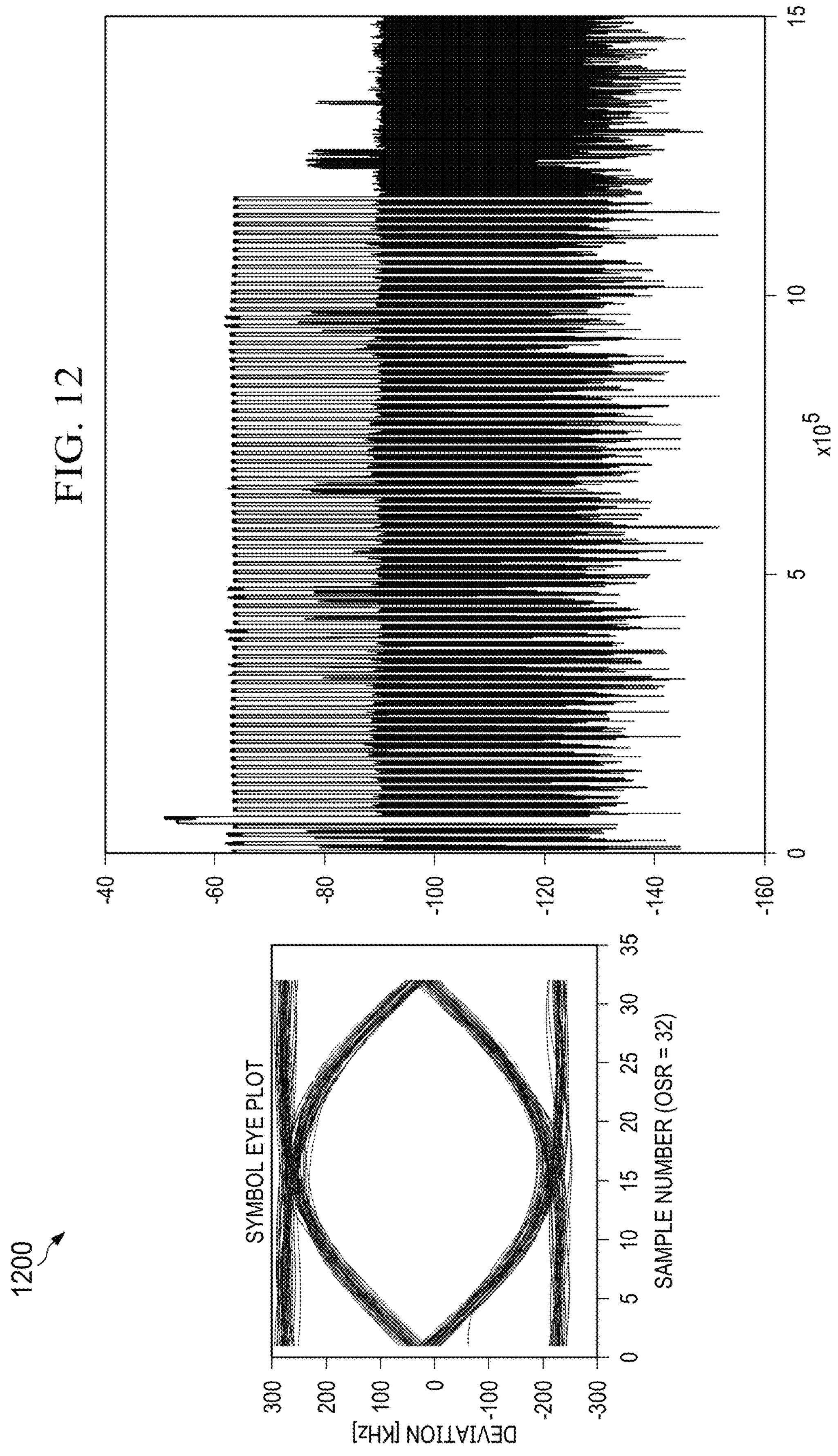
Figure 13:
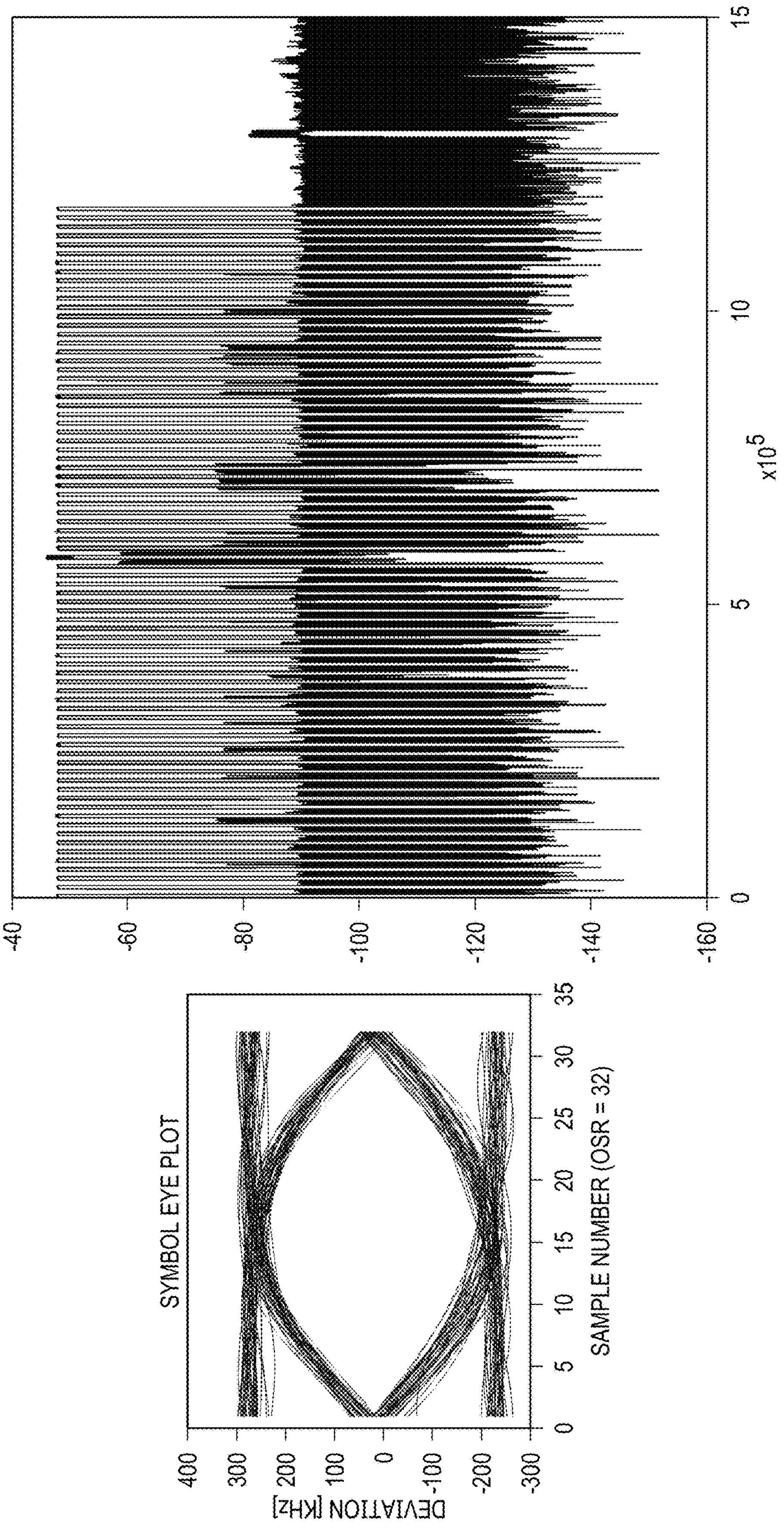
Figure 14:
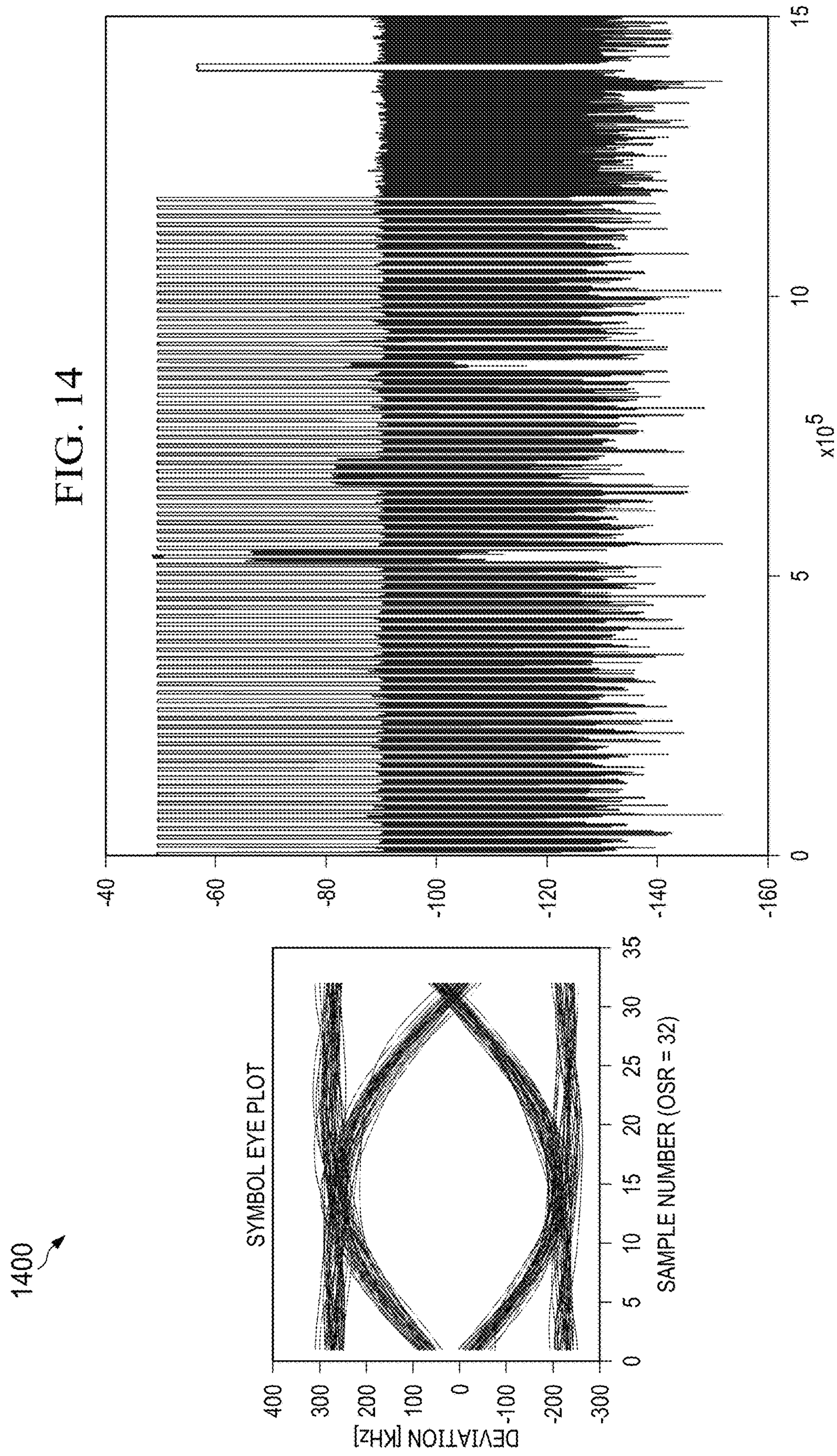
Figure 15:
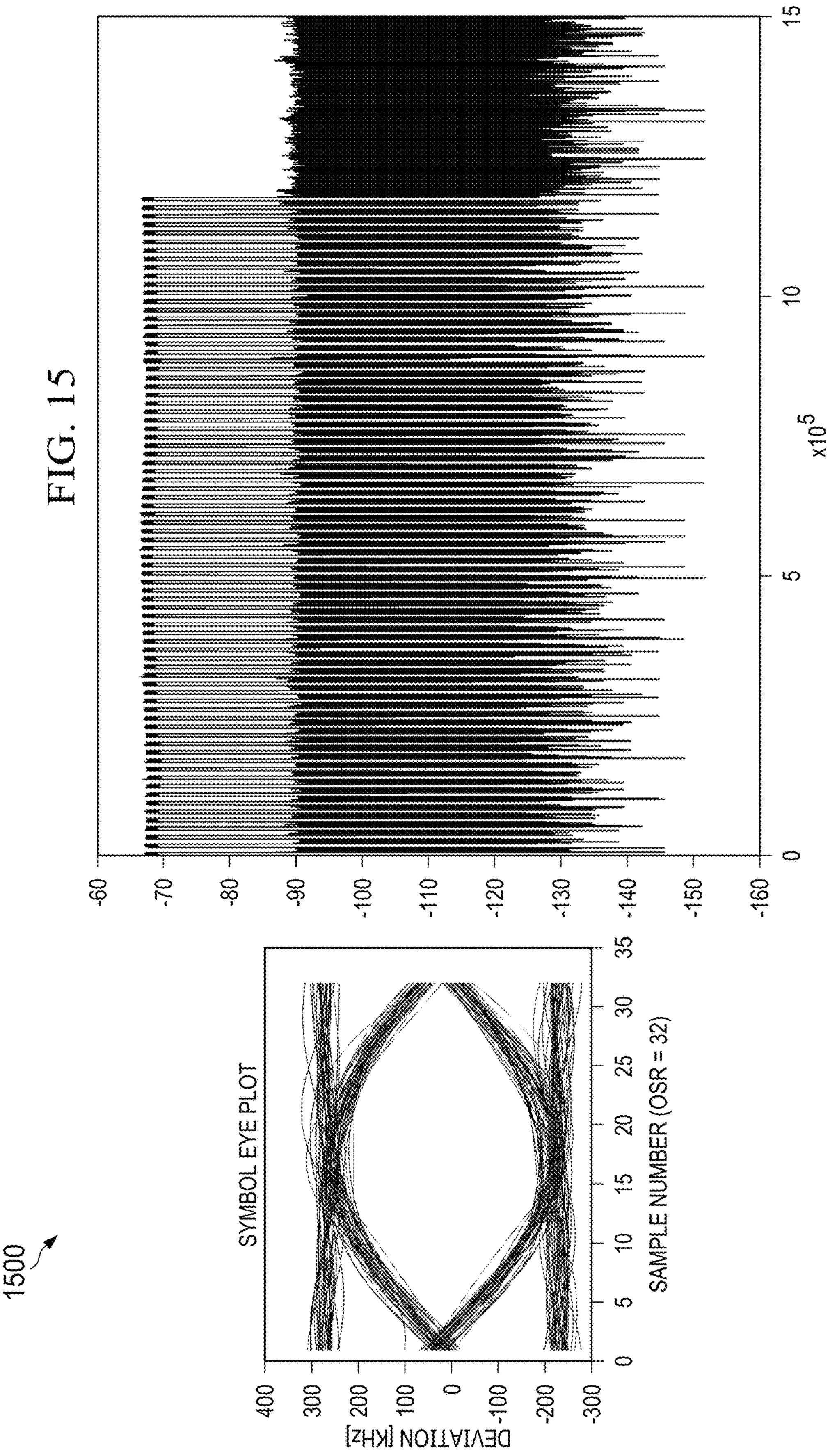
Figure 16:
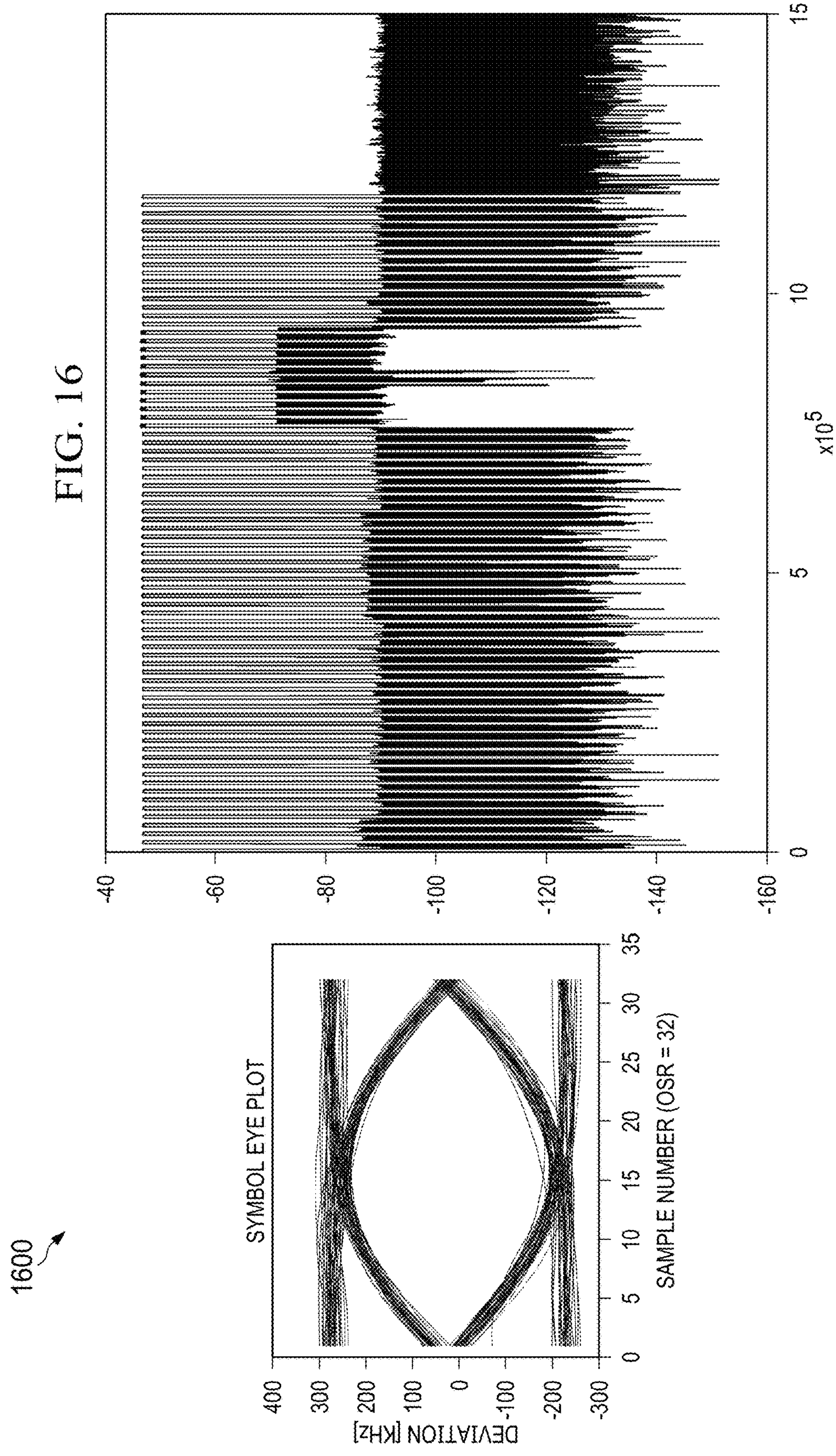
Figure 18:
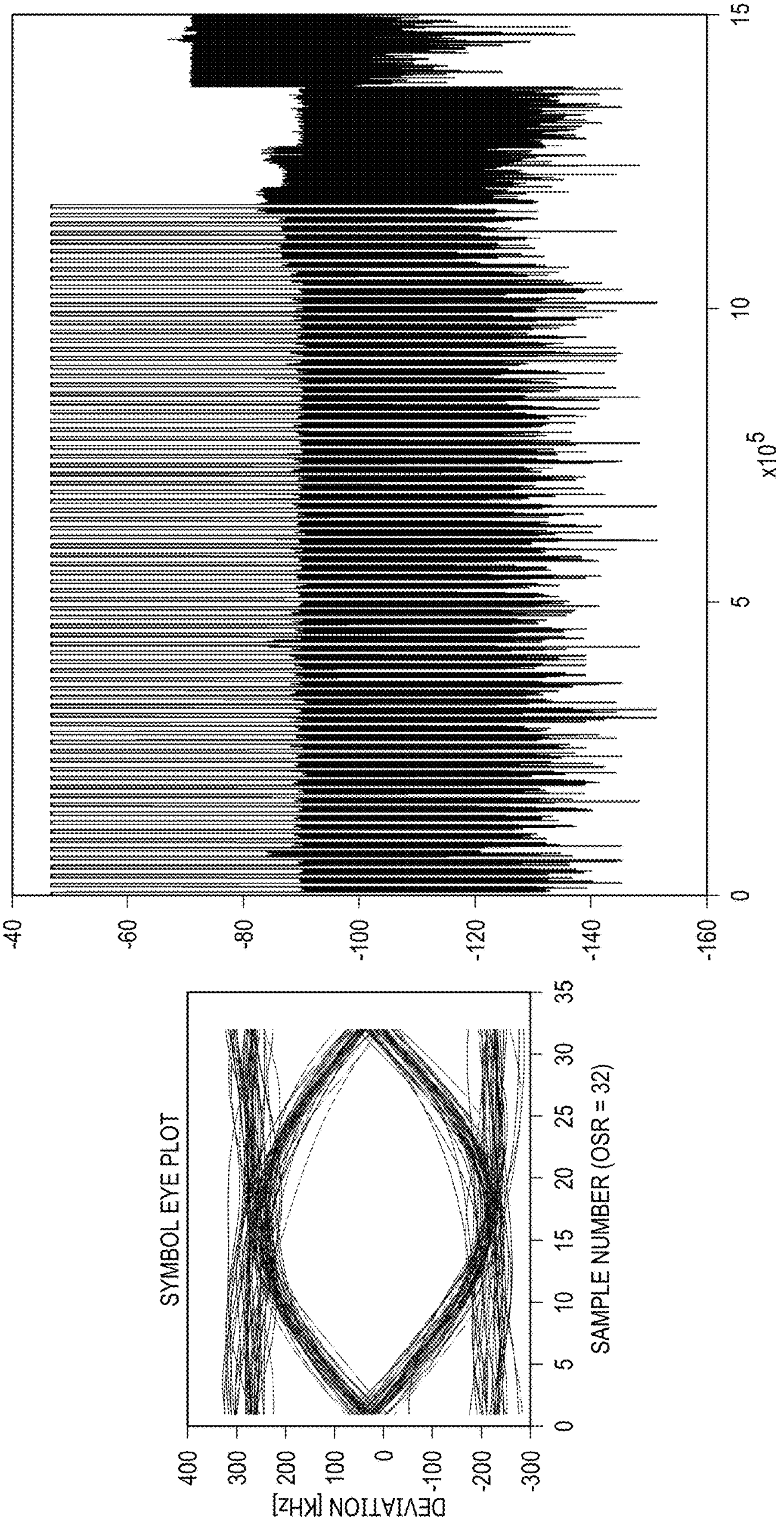
Figure 19:
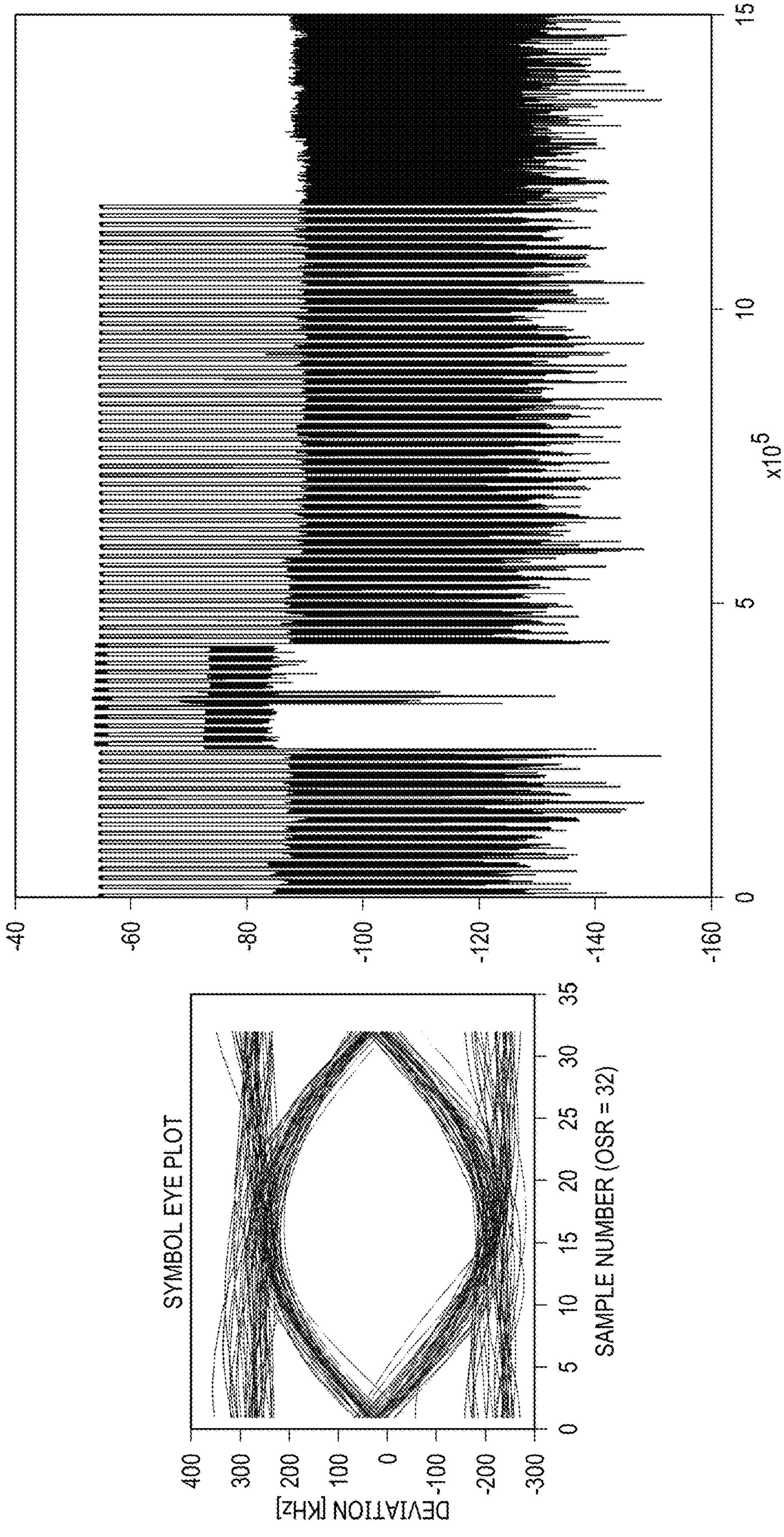
Figure 20:
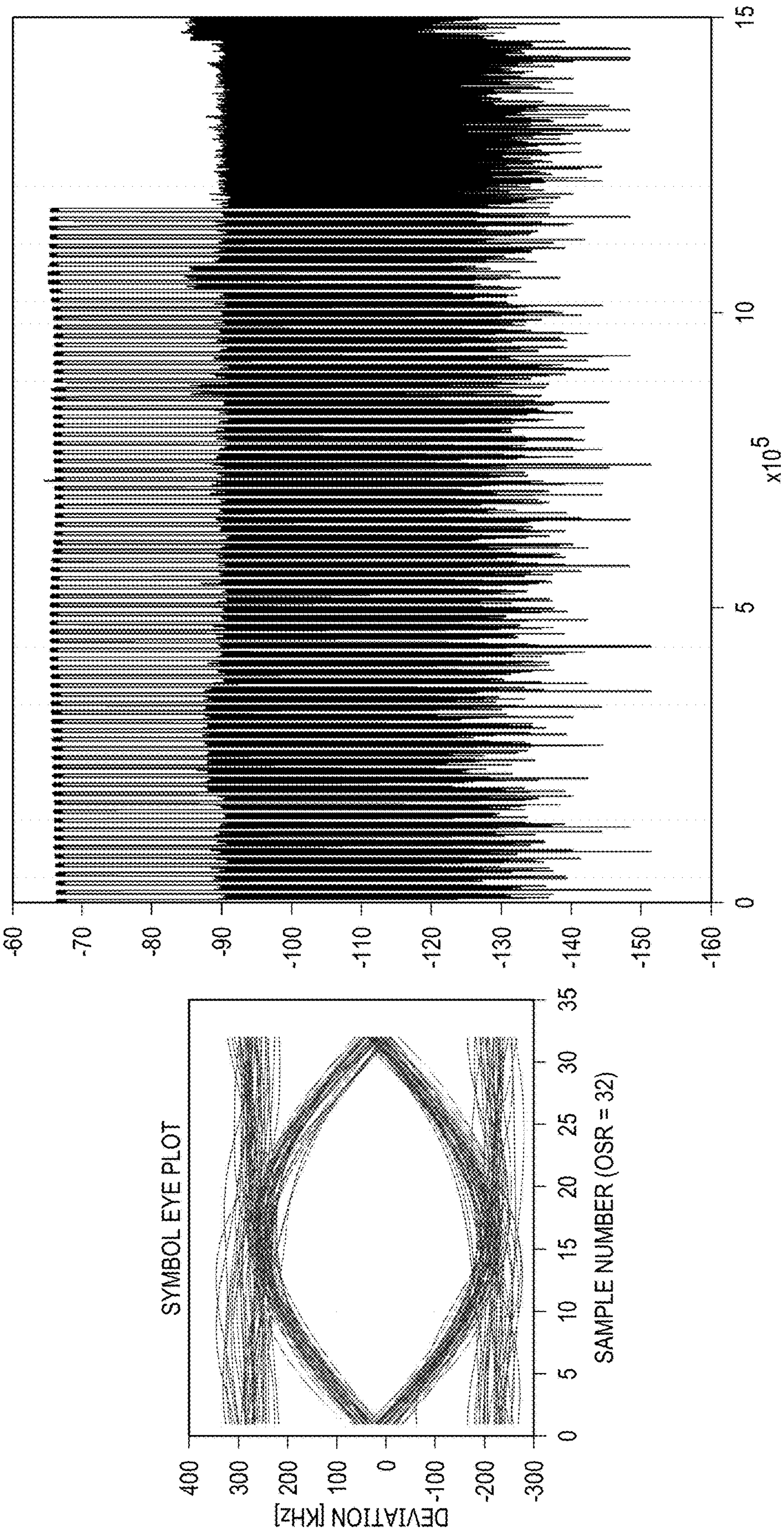

FIG. 8 shows eye diagrams 801 and 802 associated with device 110, according to an embodiment of the present invention. FIG. 9 illustrates a relationship on graphical representation 9000 between eye quality indication (EQI) (i.e., an indication of the quality of the eye diagram, which may be measured/determined in any way known in the art) and detection delay (DD), according to an embodiment of the present invention. In some embodiments, the EQI may correspond to an SNR value, such as a value of Table 1 above.

As shown in FIGS. 8 and 9, EQI may be indicative of the DD, with a higher EQI resulting in a higher DD. As shown in FIG. 9, in some embodiments, an EQI of around 0.6 results in a DD of 0. In some embodiments, a DD of 0 may be sufficiently high to allow for device 110 to detect an attack by attack devices 120. In some embodiments, the phase noise of device 105 is increased to a value to cause the EQI of device 105 to be, e.g., lower than 0.7, such as between an upper threshold value (e.g., 0.7) and a lower threshold value (e.g., 0.6). In such embodiments, modulation characteristics may be used to determine upper and lower threshold values at varying frequencies, such as between 200 kHz and 300 kHz. Based on the frequency values recorded over various test packets, a modulation characteristic between 0.6 and 0.7, for example, may be used to distort signals to prevent attacks by malicious devices, such as attack devices 120.

In some embodiments, a positive DD may require the attacker (e.g., attack devices 120) to manipulate the signal delay in such a way so as to leave a measurable imprint (e.g., distortion) in the intended receiver (e.g., device 110). In some embodiments, the real transmitter (e.g., device 105) can control its local phase noise so as to cause the attacker (e.g., attack devices 120) to resort to DD values higher than or equal to 0.

In some embodiments, there is a strong correlation between the measurement EQI (which is indicative of the spread of the signal) and minimum DD to be used by the attacker (e.g., attack devices 120).

In some embodiments, a modulation characteristic can require a certain guaranteed level of phase noise for RTT packets.

FIGS. 10-20 show DD, EQI, eye diagrams, and waveforms for various scenarios, according to embodiments of the present invention.

Example embodiments of the present disclosure are summarized here. Other embodiments can also be understood from the entirety of the specification and the claims filed herein.

Example 1. A method, including: identifying, by a first device, a level of degradation; transmitting, by the first device during a first communication phase, a first signal with a first signal quality based on the level of degradation; and transmitting, by the first device during a second communication phase, a second signal with a second signal quality, where the second signal quality is greater than the first signal quality.

Example 2. The method of example 1, where identifying the level of degradation includes identifying the level of degradation based on a capability of the first device.

Example 3. The method of one of examples 1 or 2, further including: identifying, by a second device, a reference signal based on the level of degradation; receiving, by the second device during the first communication phase, the first signal; performing, by the second device, a comparison between the reference signal and the received first signal to produce a comparison result; and determining, by the second device, whether the received first signal is authentic or not authentic based on the comparison result.

Example 4. The method of one of examples 1 to 3, further including, in response to determining that the received first signal is not authentic, terminating communication between the first device and the second device.

Example 5. The method of one of examples 1 to 4, where determining that the received first signal is not authentic includes determining that the received first signal deviates from the reference signal by more than a predetermined threshold.

Example 6. The method of one of examples 1 to 5, where: performing the comparison between the received first signal and the reference signal includes performing a correlation between the received first signal and the reference signal to generate a correlation result, where the comparison result includes the correlation result; and determining whether the received first signal is authentic or not authentic includes: determining that the received first signal is authentic when the correlation result is above a predetermined threshold; and determining that the received first signal is not authentic when the correlation result is below the predetermined threshold.

Example 7. The method of one of examples 1 to 6, further including, in response to determining that the received first signal is authentic, authenticating, by the second device, the first device for the second communication phase.

Example 8. The method of one of examples 1 to 7, further including determining a distance between the first device and the second device based on the received first signal.

Example 9. The method of one of examples 1 to 8, further including, in response to determining that the distance is below a predetermined distance, and that the received first signal is authentic, unlocking a vehicle.

Example 10. The method of one of examples 1 to 9, where the predetermined distance is three meters.

Example 11. The method of one of examples 1 to 10, where the first and second devices are part of an access control system for a room.

Example 12. The method of one of examples 1 to 11, where the level of degradation corresponds to a predetermined signal-to-noise ratio (SNR) value or a predetermined bit error rate (BER).

Example 13. The method of one of examples 1 to 12, where the first signal includes a round trip time (RTT) packet, the method further including: receiving, by a second device, the RTT packet; determining a distance between the first and second devices based on the received RTT packet; and unlocking a vehicle based on the determined distance.

Example 14. The method of one of examples 1 to 13, where determining the distance includes determining the distance based on a phase of a symbol of the RTT packet.

Example 15. The method of one of examples 1 to 14, further including: receiving, by a second device, the first signal; detecting an attack based on a distortion of the received first signal; and refusing to take an action, by the second device, based on detecting the attack.

Example 16. The method of one of examples 1 to 15, where the first signal includes a round trip time (RTT) packet, the method further including: receiving, by a second device, the RTT packet; detecting an attack based on a bit error rate (BER) of the received RTT packet; and refusing to take an action, by the second device, based on detecting the attack.

Example 17. The method of one of examples 1 to 16, further including: receiving, by a second device, the first signal; detecting an attack based on a change in phase trajectory during reception of the first signal; and refusing to take an action, by the second device, based on detecting the attack.

Example 18. The method of one of examples 1 to 17, where transmitting the first signal with a first signal quality includes transmitting the first signal using a phase-locked-loop (PLL) of the first device, the PLL having a first bandwidth, and where transmitting the second signal with the second signal quality includes transmitting the second signal with the PLL having a second bandwidth lower than the first bandwidth.

Example 19. The method of one of examples 1 to 18, where transmitting the first signal includes transmitting the first signal using Bluetooth.

Example 20. The method of one of examples 1 to 19, where transmitting the first signal includes transmitting the first signal using Bluetooth-Low-Energy (BLE).

Example 21. The method of one of examples 1 to 20, where the level of degradation includes a value at or above a predetermined first threshold value and at or below a predetermined second threshold value.

Example 22. The method of one of examples 1 to 21, where the predetermined first threshold value is 18 dB and where the predetermined second threshold value is 30 dB.

Example 23. The method of one of examples 1 to 22, where the first device is a key fob or a smartphone.

Example 24. The method of one of examples 1 to 23, where transmitting the second signal includes transmitting the second signal after transmitting the first signal.

Example 25. The method of one of examples 1 to 23, where transmitting the second signal includes transmitting the second signal before transmitting the first signal.

Example 26. A device, including: a transmitter circuit; and a processor configured to: transmit, using the transmitter circuit during a first communication phase, a first packet with a first quality; and transmit, using the transmitter circuit during a second communication phase, a second packet with a second quality lower than the first quality.

Example 27. The device of example 26, where the second communication phase occurs after the first communication phase.

Example 28. The device of example 26, where the second communication phase occurs before the first communication phase.

Example 29. The device of one of examples 26 to 28, where transmitting the first packet with the first quality includes transmitting the first packet with a first phase noise value, and where transmitting the second packet with the second quality includes transmitting the second packet with a second phase noise value that is higher than the first phase noise value.

Example 30. The device of one of examples 26 to 29, further including a phase-locked-loop (PLL) having a filter with dynamic bandwidth, where transmitting the first packet with the first quality includes configuring the dynamic bandwidth to a first bandwidth, and where transmitting the second packet with the second quality includes configuring the dynamic bandwidth to a second bandwidth higher than the first bandwidth.

Example 31. The device of one of examples 26 to 30, where transmitting the first packet with the first quality includes transmitting the first packet with a first signal-to-noise ratio (SNR) value, and where transmitting the second packet with the second quality includes transmitting the second packet with a second SNR value that is lower than the first SNR value.

Example 32. The device of one of examples 26 to 31, where the processor is further configured to identify a level of degradation, and where the second quality is based on the level of degradation.

Example 33. A device, including: a transceiver; and a processor configured to: identify a level of degradation; identify a reference signal based on the level of degradation; receive a first signal; perform a comparison between the first signal and the reference signal to produce a comparison result; and determine whether the first signal is authentic or not authentic based on the comparison result.

Example 34. The device of example 33, where to determine that the received first signal is not authentic, the processor is configured to determine that the received first signal deviates from the reference signal by more than a predetermined threshold.

Example 35. The device of one of examples 33 or 34, where: to perform the comparison between the received first signal and the reference signal, the processor is configured to perform a correlation between the received first signal and the reference signal to generate a correlation result, where the comparison result includes the correlation result; and to determine whether the received first signal is authentic or not authentic, the processor is configured to: determine that the received first signal is authentic when the correlation result is above a predetermined threshold; and determining that the received first signal is not authentic when the correlation result is below the predetermined threshold.

Example 36. The device of one of examples 33 to 35, where the processor is further configured to, in response to determining that the first signal is not authentic, refuse to take an action indicated or triggered by the first signal.

Example 37. The device of one of examples 33 to 36, where the processor is further configured to determine a distance based on the first signal.

Example 38. The device of one of examples 33 to 37, where, in response to determining that the distance is below a predetermined distance, and that the received first signal is authentic, the processor is configured to unlock a vehicle.

Example 39. The device of one of examples 33 to 38, where the predetermined distance is three meters.

Example 40. The device of one of examples 33 to 39, where the level of degradation corresponds to a predetermined signal-to-noise ratio (SNR) value or a predetermined bit error rate (BER).

Example 41. The device of one of examples 33 to 40, where the device is a vehicle or an electronic access control device.

Example 42. A method including: transmitting, by a first device, an authentication packet during an authentication phase with a first phase noise value; and transmitting, by the first device, a data packet during a communication phase with a second phase noise value that is lower than the first phase noise value.

Example 43. The method of example 42, further including: receiving, by a second device, the authentication packet; determining a distance between the first and second devices based on the authentication packet; and unlocking a vehicle based on the determined distance.

Example 44. The method of one of examples 42 or 43, where determining the distance includes determining the distance based on a phase of a symbol of the authentication packet.

Example 45. The method of one of examples 42 to 44, further including: receiving, by a second device, the authentication packet; detecting an attack based on a distortion of the received authentication packet; and refusing to take an action based on detecting the attack.

Example 46. The method of one of examples 42 to 45, further including: receiving, by a second device, the authentication packet; detecting an attack based on a bit error rate (BER) of the received authentication packet; and refusing to take an action based on detecting the attack.

Example 47. The method of one of examples 42 to 46, further including: receiving, by a second device, the authentication packet; detecting an attack based on a change in phase trajectory during reception of the authentication packet; and refusing to take an action based on detecting the attack.

Example 48. The method of one of examples 42 to 47, where transmitting the authentication packet with the first phase noise value includes transmitting the authentication packet with a phase-locked-loop (PLL) of the first device having a first bandwidth, and where transmitting the data packet with the second phase noise value includes transmitting the data packet with the PLL of the first device having a second bandwidth lower than the first bandwidth.

Example 49. The method of one of examples 42 to 48, where transmitting the authentication packet includes transmitting the authentication packet using Bluetooth.

Example 50. The method of one of examples 42 to 49, where transmitting the authentication packet using Bluetooth includes transmitting the authentication packet using Bluetooth Low Energy (BLE).

Example 51. The method of one of examples 42 to 50, where the first phase noise value corresponds to a signal-to-noise ratio (SNR) of a second device between a first predetermined SNR threshold value and a second predetermined SNR threshold value.

Example 52. The method of one of examples 42 to 51, where the first device is a key fob, or smartphone.

Example 53. A method including: transmitting, by a first device, an authentication packet during an authentication phase, where: during a first portion of the authentication phase, the authentication packet is transmitted with a first phase noise value; and during a second portion of the authentication phase, the authentication packet is transmitted with a second phase noise value that is different from the first phase noise value.

Example 54. A wireless device including: a phase-locked-loop (PLL) having a filter with dynamic bandwidth; and a transmitter circuit configured to: transmit an authentication packet using the filter with a first bandwidth, and transmit a data packet using the filter with a second bandwidth lower than the first bandwidth.

Example 55. A method including: transmitting, by a first device, an authentication packet with a first signal-to-noise ratio (SNR) value during an authentication phase; and transmitting, by the first device, a data packet with a second SNR value during a communication phase, where the second SNR value is higher than the first SNR value.

Example 56. The method of example 55, further including: receiving, by a second device, the authentication packet; determining a distance between the first and second devices based on the authentication packet; and unlocking a vehicle based on the determined distance.

Example 57. The method of one of examples 55 or 56, where determining the distance includes determining the distance based on a phase of a symbol of the authentication packet.

Example 58. The method of one of examples 55 to 57, further including: receiving, by a second device, the authentication packet; detecting an attack based on a distortion of the received authentication packet; and refusing to take an action based on detecting the attack.

Example 59. The method of one of examples 55 to 58, further including: receiving, by a second device, the authentication packet; detecting an attack based on a bit error rate (BER) of the received authentication packet; and refusing to take an action based on detecting the attack.

Example 60. The method of one of examples 55 to 59, further including: receiving, by a second device, the authentication packet; detecting an attack based on a change in phase during reception of the authentication packet; and refusing to take an action based on detecting the attack.

Example 61. The method of one of examples 55 to 60, where transmitting the authentication packet with the first SNR value includes transmitting the authentication packet with a phase-locked-loop (PLL) of the first device having a first bandwidth, and where transmitting the data packet with the second SNR value includes transmitting the data packet with the PLL of the first device having a second bandwidth lower than the first bandwidth.

Example 62. The method of one of examples 55 to 61, where transmitting the authentication packet includes transmitting the authentication packet using Bluetooth.

Example 63. The method of one of examples 55 to 62, where transmitting the authentication packet includes transmitting the authentication packet using Bluetooth Low Energy (BLE).

Example 64. The method of one of examples 55 to 63, where the first SNR value is between a first predetermined SNR threshold value and a second predetermined SNR threshold value.

Example 65. The method of one of examples 55 to 64, where the first device is a key fob, or a smartphone.

Example 66. A method, including: transmitting, by a first device, an authentication packet during an authentication phase, where: during a first portion of the authentication phase, the authentication packet is transmitted with a first signal-to-noise ratio (SNR) value; and during a second portion of the authentication phase, the authentication packet is transmitted with a second SNR value that is different from the first SNR value.

Example 67. A method, including: identifying, by a first device, a level of degradation based on a predetermined set of levels of degradation; transmitting, by the first device during a first communication phase, a first signal with a first signal quality based on the identified level of degradation; and transmitting, by the first device during a second communication phase, a second signal with a second signal quality corresponding to another level of degradation of the predetermined set, where the second signal quality is greater than the first signal quality.

Example 68. The method of example 67, where the predetermined set of levels of degradation includes: a first level of degradation corresponding to a signal-to-noise ratio (SNR) of 18 dB; a second level of degradation corresponding to an SNR of 20 dB; a third level of degradation corresponding to an SNR of 22 dB; a fourth level of degradation corresponding to an SNR of 24 dB; a fifth level of degradation corresponding to an SNR of 26 dB; a sixth level of degradation corresponding to an SNR of 28 dB; and a seventh level of degradation corresponding to an SNR of 30 dB.

Example 69. The method of one of examples 67 or 68, where the first signal quality corresponds to a signal-to-noise ratio (SNR) of 24 dB.

Example 70. The method of one of examples 67 to 68, where the second signal quality corresponds to a signal-to-noise ratio (SNR) of 24 dB.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

While this disclosure has been described with reference to illustrative embodiments, this description is not limiting. Various modifications and combinations of the illustrative embodiments, as well as other embodiments, will be apparent to persons skilled in the art upon reference to the description.

What is claimed is:

1. A method, comprising:

transmitting, by a first device to a second device, a proposed degradation level;

receiving, by the first device from the second device an acknowledgment responsive to the proposed degradation level;

setting a level of degradation level to the proposed degradation level after receiving the acknowledgement;

transmitting, by the first device during a first communication phase, a first signal with a first signal quality based on the level of degradation; and transmitting, by the first device during a second communication phase, a second signal with a second signal quality, wherein the second signal quality is greater than the first signal quality.

2. The method of claim 1, wherein identifying the level of degradation comprises identifying the level of degradation based on a capability of the first device.

3. A method comprising:

receiving, by a first device from a second device, a proposed degradation level;

transmitting, by the first device to the second device, an acknowledgment responsive to the proposed degradation level;

setting, by the first device a level of degradation level to the proposed degradation level;

identifying, by the first device, a reference signal based on the level of degradation;

receiving, by the first device, a signal;

performing, by the first device, a comparison between the reference signal and the received signal to produce a comparison result; and determining, by the first device, whether the received signal is authentic or not authentic based on the comparison result.

4. The method of claim 3, further comprising, in response to determining that the received signal is not authentic, terminating communication between the first device and the second device.

5. The method of claim 3, wherein determining that the received signal is not authentic comprises determining that the received signal deviates from the reference signal by more than a predetermined threshold.

6. The method of claim 3, wherein:

performing the comparison between the received signal and the reference signal comprises performing a correlation between the received signal and the reference signal to generate a correlation result, wherein the comparison result comprises the correlation result; and determining whether the received signal is authentic or not authentic comprises:

determining that the received signal is authentic when the correlation result is above a predetermined threshold; and determining that the received signal is not authentic when the correlation result is below the predetermined threshold.

7. The method of claim 3, further comprising, in response to determining that the received signal is authentic, authenticating, by the first device, the second device.

8. The method of claim 3, further comprising determining a distance between the first device and the second device based on the received signal.

9. The method of claim 8, further comprising, in response to determining that the distance is below a predetermined distance, and that the received signal is authentic, unlocking a vehicle.

10. The method of claim 3, wherein the first and second devices are part of an access control system for a room.

11. The method of claim 1, wherein the level of degradation corresponds to a predetermined signal-to-noise ratio (SNR) value or a predetermined bit error rate (BER).

12. The method of claim 3, wherein the first received signal comprises a round trip time (RTT) packet, the method further comprising:

receiving, by the first device, the RTT packet;

determining a distance between the first and second devices based on the received RTT packet; and unlocking a vehicle based on the determined distance.

13. The method of claim 3, further comprising:

receiving, by the first device, the first received signal;

detecting an attack based on a distortion of the received signal; and refusing to take an action, by the first device, based on detecting the attack.

14. The method of claim 3, wherein the received signal comprises a round trip time (RTT) packet, the method further comprising:

receiving, by the first device, the RTT packet;

detecting an attack based on a bit error rate (BER) of the received RTT packet; and refusing to take an action, by the first device, based on detecting the attack.

15. The method of claim 3, further comprising:

detecting an attack based on a change in phase trajectory during reception of the received signal; and refusing to take an action, by the first device, based on detecting the attack.

16. The method of claim 1, wherein transmitting the first signal with a first signal quality comprises transmitting the first signal using a phase-locked-loop (PLL) of the first device, the PLL having a first bandwidth, and wherein transmitting the second signal with the second signal quality comprises transmitting the second signal with the PLL having a second bandwidth lower than the first bandwidth.

17. The method of claim 1, wherein transmitting the first signal comprises transmitting the first signal using Bluetooth.

18. The method of claim 1, wherein transmitting the first signal comprises transmitting the first signal using Bluetooth-Low-Energy (BLE).

19. The method of claim 1, wherein the level of degradation comprises a value at or above a predetermined first threshold value and at or below a predetermined second threshold value.

20. The method of claim 1, wherein the first device is a key fob or a smartphone.

21. The method of claim 1, wherein transmitting the second signal comprises transmitting the second signal after transmitting the first signal.

* * * * *